(12) United States Patent
Ukita et al.

(10) Patent No.: US 9,236,931 B2
(45) Date of Patent: Jan. 12, 2016

(54) RELAY DEVICE, RECEIVING DEVICE, TRANSMITTING DEVICE, AND RELAY METHOD

(75) Inventors: Yosuke Ukita, Osaka (JP); Hironori Nakae, Osaka (JP); Hiroshi Hayashino, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 565 days.

(21) Appl. No.: 13/696,819

(22) PCT Filed: Apr. 3, 2012

(86) PCT No.: PCT/JP2012/002324
§ 371 (c)(1),
(2), (4) Date: Nov. 8, 2012

(87) PCT Pub. No.: WO2012/140850
PCT Pub. Date: Oct. 18, 2012

(65) Prior Publication Data
US 2013/0077558 A1 Mar. 28, 2013

(30) Foreign Application Priority Data
Apr. 15, 2011 (JP) .................................. 2011-091498

(51) Int. Cl.
| H04B 7/15 | (2006.01) |
| H04W 16/26 | (2009.01) |
| H04B 7/155 | (2006.01) |

(52) U.S. Cl.
CPC .............. *H04B 7/15* (2013.01); *H04B 7/15528* (2013.01); *H04W 16/26* (2013.01)

(58) Field of Classification Search
CPC ..... H04L 47/34; H04L 69/324; H04W 28/04; H04W 28/065; H04W 88/04; H04W 16/26; H04N 21/6375; H04B 7/15; H04B 7/15528
See application file for complete search history.

(56) References Cited

U.S. PATENT DOCUMENTS

| 5,339,316 A | 8/1994 | Diepstraten |
| 7,787,437 B2 | 8/2010 | Sakoda |

(Continued)

FOREIGN PATENT DOCUMENTS

| JP | 3226140 | 11/2001 |
| JP | 2007-208830 | 8/2007 |

(Continued)

OTHER PUBLICATIONS

International Search Report issued Jul. 3, 2012 in International (PCT) Application No. PCT/JP2012/002324.

*Primary Examiner* — Ayaz Sheikh
*Assistant Examiner* — Debebe Asefa
(74) *Attorney, Agent, or Firm* — Wenderoth, Lind & Ponack, L.L.P.

(57) ABSTRACT

A relay device according to the present invention includes: a receiving unit which receives a frame; a transmitting unit which transmits a frame; a frame determination unit which stores therein the first frame when the frame determination unit determines that the received frame is the first frame; a proxy ACK generation unit which generates a third frame which is a proxy frame of a second frame which is a frame to be transmitted from the receiving device, as a receipt acknowledgement to the first frame; and a communication control unit which: causes the transmitting unit to transmit the third frame; sets an extended active period in the inactive period subsequent to the active period; and transmits the first frame in the extended active period when the receiving unit does not receive the second frame within a predetermined period after reception of the first frame.

11 Claims, 25 Drawing Sheets

(56) References Cited

U.S. PATENT DOCUMENTS

| | | | |
|---|---|---|---|
| 7,965,698 B2 * | 6/2011 | Jung | 370/349 |
| 8,144,685 B2 | 3/2012 | Sakoda | |
| 8,570,917 B2 * | 10/2013 | Okuda | 370/293 |
| 8,767,559 B2 * | 7/2014 | Kamada | 370/242 |
| 2005/0068934 A1 | 3/2005 | Sakoda | |
| 2009/0097440 A1 | 4/2009 | Sakoda | |
| 2009/0097463 A1 | 4/2009 | Sakoda | |
| 2009/0097464 A1 | 4/2009 | Sakoda | |

FOREIGN PATENT DOCUMENTS

| | | |
|---|---|---|
| JP | 2010-021878 | 1/2010 |
| JP | 2010-263297 | 11/2010 |
| WO | 2004/071022 | 8/2004 |

* cited by examiner

| SN (Sequence Number) | Device address | |
|---|---|---|
| 1 to 63 | 0x0011 | |
| | 0x0012 | 116a |
| | : | |
| 64 to 127 | 0x0121 | |
| | 0x0123 | |
| | : | |
| 128 to 191 | 0x0a13 | |
| | : | |
| 192 to 255 | 0x1114 | |
| | : | |

| SN (Sequence Number) | Device address | |
|---|---|---|
| 1 to 15 | 0x0011 | 116b |
| 16 to 31 | 0x0013 | |
| 32 to 47 | 0x0121 | |
| : | : | |

RELAY DEVICE, RECEIVING DEVICE, TRANSMITTING DEVICE, AND RELAY METHOD

TECHNICAL FIELD

The present invention relates to relay devices. The present invention particularly relates to a relay device and so on in a wireless communication system in which a wireless communication is performed in an active period and the wireless communication is interrupted in an inactive period, and in which the relay device relays a first frame transmitted toward a receiving device from a transmitting device.

BACKGROUND ART

In recent years, there is an increasing interest in networks of low-power consumption wireless terminals such as WPAN (Wireless Personal Area Network) and sensor networks which are represented by the IEEE (Institute of Electrical and Electronics Engineers) 802.15 standard (for example, see PTL 1). Also, as a system similar to the networks, an active RF (Radio Frequency) tag that transmits wireless signals by itself can be mentioned.

CITATION LIST

Patent Literature

[PTL 1] Japanese Patent Publication No. 3226140

SUMMARY OF INVENTION

Technical Problem

However, there is a problem in conventional wireless networks that excessive delay time can occur when a relay device relays a frame.

Thus, an object of the present invention is to provide a relay device which solves the above conventional problem and allows frame relay with low delay.

Solution to Problem

To solve the conventional problems, a relay device according to one aspect of the present invention is a relay device for relaying a first frame transmitted toward a receiving device from a transmitting device in a wireless communication system in which, between the transmitting device and the receiving device, wireless communication is performed in an active period and the wireless communication is interrupted in an inactive period, the relay device including: a receiving unit configured to receive a frame; a transmitting unit configured to transmit a frame; a frame determination unit configured to store therein the first frame when the frame determination unit determines that the received frame is the first frame; a proxy ACK generation unit configured to generate a third frame which is a proxy frame of a second frame which is a frame to be transmitted from the receiving device, as a receipt acknowledgement to the first frame; and a communication control unit configured to: cause the transmitting unit to transmit the third frame; set an extended active period which is a period in which communication is allowed to continue after an end of the active period, in the inactive period subsequent to the active period; and cause the transmitting unit to transmit to the receiving device, in the extended active period, a fourth frame which is the first frame stored in the frame determination unit, when the receiving unit does not receive the second frame within a predetermined period after reception of the first frame.

It should be noted that the present invention can be implemented not only as such a relay device but also as a relay method having characteristic units, as steps, included in the relay device, or as a program for causing a computer to execute such characteristic steps. In addition, such a program can, of course, be distributed by being stored in a storage medium such as CD-ROM (Compact Disc Read Only Memory) and via a transmission medium such as the Internet.

Furthermore, the present invention can be implemented as a semiconductor integrated circuit (LSI) for achieving some or all of the functionality of such a relay device and so on, or as a wireless communication system which includes such a relay device and so on.

Advantageous Effects of Invention

A relay device which allows frame relay with low delay can be provided.

DESCRIPTION OF EMBODIMENTS (Underlying Knowledge Forming Basis of the Present Disclosure)

Figure 25:
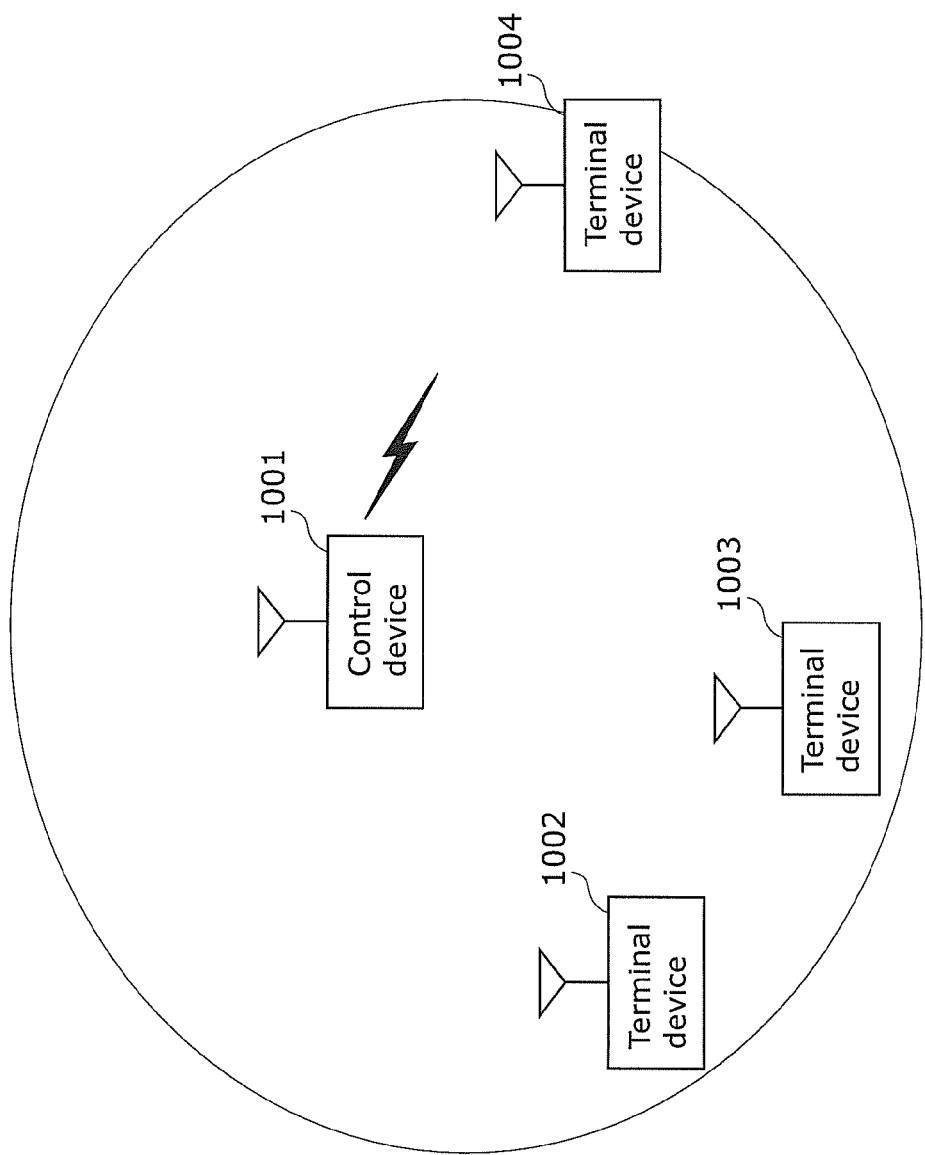
FIG. 25 is a first diagram showing a wireless communication network configuration in the Background Art section.

In relation to the network described in the Background Art section, the inventors have found the following problems:

FIG. 25 shows a wireless network by way of example. In FIG. 25, the wireless network includes a wireless control device which is a wireless device, and a plurality of wireless terminal devices. A wireless device indicated by a reference sign 1001 is a wireless control device (hereinafter, referred to as a control device). Wireless devices indicated by reference signs 1002, 1003, and 1004 are wireless terminal devices (hereinafter, each referred to as a terminal device).

A control device 1001 periodically broadcasts control information in a beacon frame to terminal devices 1002, 1003, and 1004. The terminal devices 1002 to 1004 communicate with the control device 1001, based on the control information. Various access control schemes may be employed for the control device and the terminal devices, and examples of which include CSMA (Carrier Sense Multiple Access/Collision Detection), TDMA (Time Division Multiple Access), and FDMA (Frequency Division Multiple Access).

The wireless devices (the control device and the terminal devices) used in the wireless network have features in low power consumption performance. For example, to reduce the power consumption of the wireless devices, types of communication period are provided in the wireless network, including an active period in which the communication is performed and an inactive period in which no communication is performed and the wireless devices go to a sleep state (communication functionality is turned OFF). The longer the inactive period is set, the longer the sleep state can be, and thus the power consumption can be reduced.

The terminal devices 1002 to 1004 are notified of the start time and end time of each of the active and inactive periods by the control information included in the beacon frame transmitted from the control device 1001, and each perform a sleep process (namely, turning ON/OFF the communication functionality), according the information.

In the wireless network shown in FIG. 25, however, there is a case where the wireless control device and the wireless terminal devices cannot perform direct communication therebetween due to installation environment such as home and office, and presence or absence of obstacles. As a solution, there is a method for relay forwarding frames. For example, as a technique to automatically perform the routing configuration at a destination of the relay connection, there are standards such as MANET (Mobile Ad-hoc Network) of IETF (Internet Engineering Task Force). Any of the standards, however, employs a complex routing technique, which is costly and difficult to be readily introduced to common households. Thus, the method is disclosed in PTL 1 as a method for automatically performing wireless relaying without performing complex routing.

The configuration of the wireless network disclosed in PTL 1 will be described with reference to FIG. 26.

Figure 26:
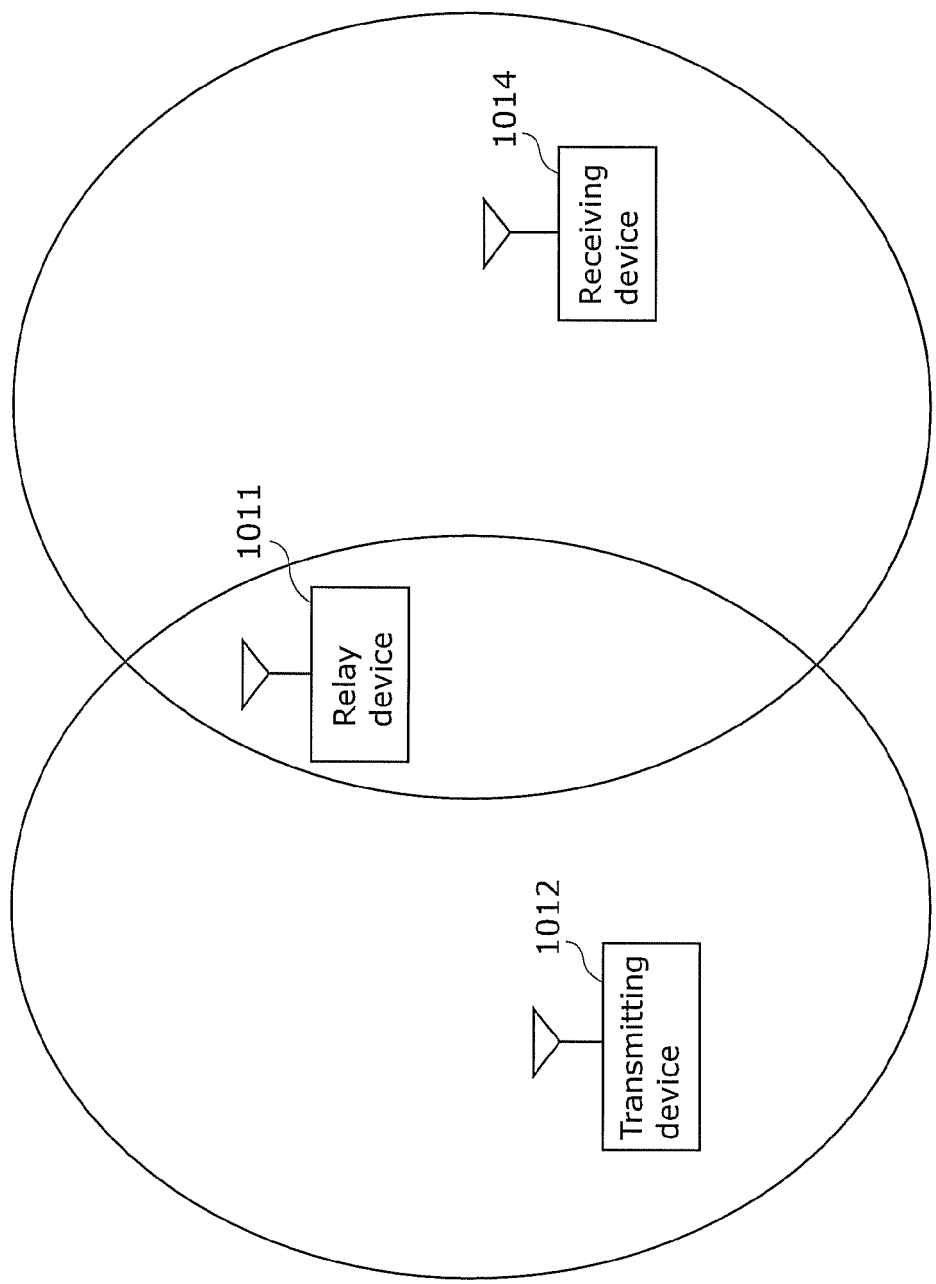
FIG. 26 is a second diagram showing a wireless communication network configuration in a related technique.

It is assumed that the direct communication is allowed between a transmitting device 1012 and a relay device 1011, and the direct communication is allowed between the relay device 1011 and a receiving device 1014, in the wireless network shown in FIG. 26. Moreover, it is assumed that the transmitting device 1012 and the receiving device 1014 are located away from each other at which the direct communication therebetween is not allowed.

An operation when the transmitting device 1012 transmits a data frame toward the receiving device 1014 in such a situation will be described with reference to FIG. 27.

Figure 27:
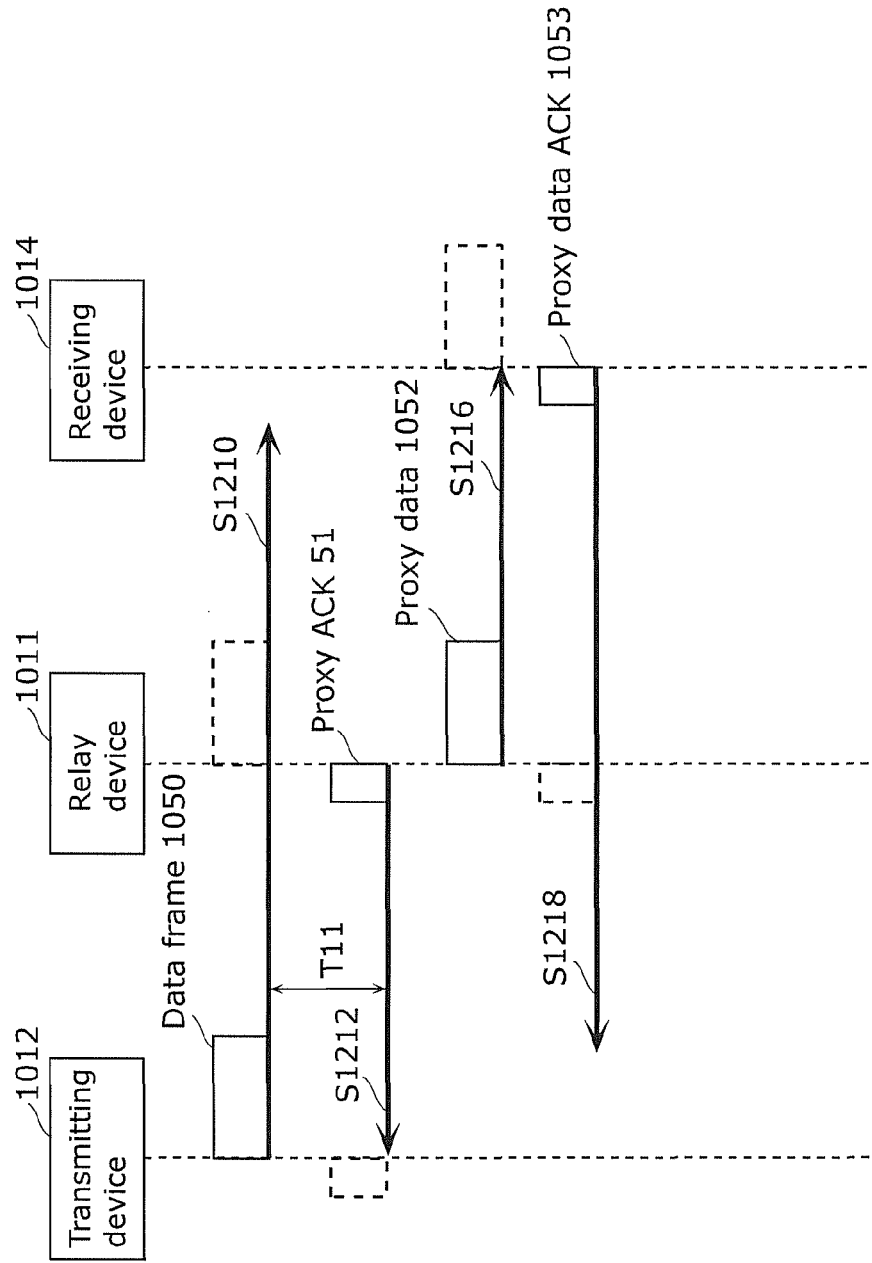
FIG. 27 is a sequence diagram showing a processing flow of relaying a frame in the related technique.

FIG. 27 is a sequence diagram illustrating a processing flow of relaying a wireless frame in the related technique. In FIG. 27, timing at which the transmitting device 1012, the relay device 1011, and the receiving device 1014 transmit frames is shown in time series in the vertical axis direction.

When the transmitting device 1012 transmits a data frame 1050 toward the receiving device 1014, the receiving device 1014 cannot receive the data frame 1050 (S1210). This is because, as described above, the transmitting device 1012 and the receiving device 1014 are not in a range where the direct communication therebetween is allowed. Thus, an acknowledgement (ACK) frame corresponding to the data frame 1050 is not transmitted from the receiving device 1014.

On the other hand, the relay device 1011 is in the range where the direct communication thereto from the transmitting device 1012 is allowed, and thus, the relay device 1011 can receive the data frame 1050. The relay device 1011 parses the received data frame 1050 to determine whether a destination address is the own address. The destination of the data frame 1050 is the receiving device 1014 as a result, and thus the relay device 1011 temporarily stores the data frame 1050 in a buffer in the relay device 1011.

Next, the relay device 1011 waits for wait time T11 for the acknowledgement (ACK) frame which is transmitted from the receiving device 1014 toward the transmitting device 1012 and corresponds to the data frame 1050 transmitted from the transmitting device 1012. If the relay device 1011 fails to receive the ACK frame corresponding to the data frame 1050, from the receiving device 1014 in the wait time T11, the relay device 1011 determines that the data frame 1050 has failed to reach the receiving device 1014. The relay device 1011 transmits, to the transmitting device 1012, a proxy ACK frame (hereinafter, sometimes referred to as a proxy ACK) 1051 corresponding to the data frame 1050, on behalf of the receiving device 1014 (S1212).

Here, the destination address of the proxy ACK frame 1051 is set to an address of the receiving device 1014. The transmitting device 1012 determines that the proxy ACK frame 1051 has been transmitted from the receiving device 1014, and ends the transmission process of the data frame 1050.

Next, the relay device 1011 relays the data frame by transmitting, as a proxy data frame (hereinafter, sometimes referred to as proxy data) 1052, the data frame 1050 stored in the buffer in the relay device 1011 to the receiving device 1014 (S1216). Upon reception of the proxy data frame 1052, the receiving device 1014 transmits a proxy data ACK 1053 back toward the transmitting device 1012 (S1218). The transmitting device 1012 is not in the range where the direct communication thereto from the receiving device 1014 is allowed, and thus does not receive the proxy data ACK 1053.

According to the operation described above, the relay device 1011 relays the data frame transmitted toward the receiving device 1014 from the transmitting device 1012, thereby allowing the communication between the transmitting device 1012 and the receiving device 1014 between which the direct communication is not allowed.

Figure 2:
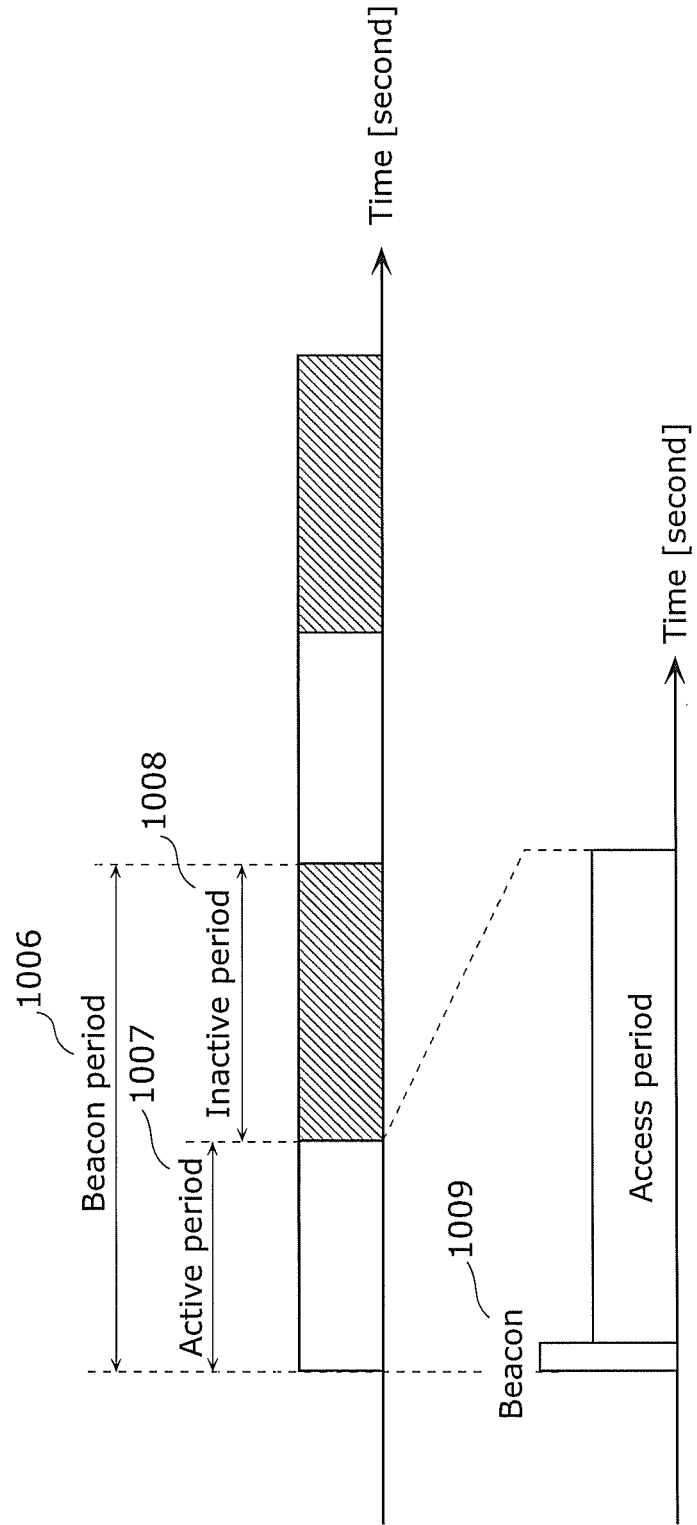
FIG. 2 is a diagram showing a relationship between a beacon period indicated by a beacon frame, an active period, and an inactive period.

However, in PTL 1, a wireless communication system in which there are an active period 1007 and an inactive period 1008 as shown in FIG. 2 is not assumed. Thus, when the relay device and so on according to PTL 1 operate in the wireless communication system where there are the active period 1007 and the inactive period 1008, a problem arises that delay occurs in frame relay. This is because when the communication period enters the inactive period 1008, the entire wireless system including the relay device 1011, the transmitting device 1012, and the receiving device 1014 go to the sleep state. In particular, if the entire wireless system enters the sleep state after a proxy ACK is transmitted from the relay device 1011 to the transmitting device 1012 and before the transmission of proxy data from the relay device 1011 to the receiving device 1014 is completed, an incident may undesirably occur in which the transmitting device 1012 proceeds internal processing, presuming, despite that the transmission of the data frame to the receiving device 1014 is in fact delayed, that the transmission has been completed without delay. As a result, process mismatch may occur between the transmitting device 1012 and the receiving device 1014.

As described above, if a frame is relayed in the wireless communication system in which the wireless communication is performed in the active period and the wireless communication is interrupted in the inactive period, excessive delay is likely to occur when the communication period enters the inactive period in the middle of relay processing. The delay has a potential to adversely effect on the application.

To solve such problems, a relay device according to one aspect of the present invention is a relay device for relaying a first frame transmitted toward a receiving device from a transmitting device in a wireless communication system in which, between the transmitting device and the receiving device, wireless communication is performed in an active period and the wireless communication is interrupted in an inactive period, the relay device including: a receiving unit configured to receive a frame; a transmitting unit configured to transmit a frame; a frame determination unit configured to store therein the first frame when the frame determination unit determines that the received frame is the first frame; a proxy ACK generation unit configured to generate a third frame which is a proxy frame of a second frame which is a frame to be transmitted from the receiving device, as a receipt acknowledgement to the first frame; and a communication control unit configured to: cause the transmitting unit to transmit the third frame; set an extended active period which is a period in which communication is allowed to continue after an end of the active period, in the inactive period subsequent to the active period; and cause the transmitting unit to transmit to the receiving device, in the extended active period, a fourth frame which is the first frame stored in the frame determination unit, when the receiving unit does not receive the second frame within a predetermined period after reception of the first frame.

According to the above configuration, for the completion of transmission of the frame being relayed, the relay device sets the extended active period which is a period in which the own device is allowed to communicate in the inactive period. As a result, the relay frame can be prevented from going to the sleep state while transmitting the frame. Thus, the relay device can be implemented which can relay frames with low delay in the wireless communication system in which the wireless communication is performed in the active period and the wireless communication is interrupted in the inactive period.

Specifically, when the receiving unit does not receive the second frame within the predetermined period after reception of the first frame, the communication control unit may: cause the transmitting unit to transmit the third frame to the transmitting device and the receiving device; set the extended active period to allow transmission of the fourth frame to be completed within the active period; and cause the transmitting unit to transmit the fourth frame to the receiving device.

Moreover, the relay device may further include a proxy data ACK detection unit configured to detect a fifth frame transmitted by the receiving device to the transmitting device, as a receipt acknowledgement to the fourth frame, wherein the proxy data ACK detection unit may store, in association with an identifier unique to the receiving device, a confirmation result indicating whether the fifth frame has been detected within a predetermined period after transmission of the fourth frame, and when the second frame is not received from the receiving device within a predetermined period and the confirmation result in association with the identifier of the receiving device does not indicate that detection of the fifth frame has failed, the communication control unit may: cause the transmitting unit to transmit the third frame to the receiving device; set the extended active period to allow transmission of the fourth frame to be completed within the active period; and cause the transmitting unit to transmit the fourth frame to the receiving device.

According to the above configuration, the relay device does not relay a frame for the receiving device to which the relay device has previously transmitted a proxy data and from which the relay device has not received a corresponding acknowledgement. As a result, vain frame transmission by the relay device is prevented, leading to improvement in wireless resources and reduction of frame collision.

A receiving device according to an aspect of the present invention is a receiving device for receiving a first frame relayed by a relay device after the first frame is transmitted from a transmitting device in a wireless communication system in which between the transmitting device and the receiving device, wireless communication is performed in an active period and the wireless communication is interrupted in an inactive period, the receiving device including: a receiving unit configured to receive a frame which includes a sequence number; a relay determination unit configured to determine, based on the sequence number included in the received frame, whether the received frame is a frame that has been transmitted from the relay device; and a communication control unit configured to, when it is determined that the received frame is the frame that has been transmitted from the relay device, set an extended active period which is a period in which communication is allowed to continue after an end of the active period, in the inactive period subsequent to the active period, to allow reception of the first frame relayed by the relay device to be completed within the active period.

According to the above configuration, when the receiving device determines from the sequence number of the received frame that the received frame has been transmitted by the relay device, the receiving devices sets the extended active period so as to receive all frames to subsequently be transmitted by the relay device. As a result, the frame transmission with low delay is possible.

Specifically, the receiving device may further include an SN storage unit configured to store, in association, an identifier unique to the receiving device and a sequence number that can be assigned to the receiving device by the transmitting device, wherein the relay determination unit may include: a frame determination unit configured to determine a type of the frame received by the receiving unit; and an SN determination unit, and the frame includes a sequence number assigned by the transmitting device and type information indicating the type of the frame, the frame determination unit may determine whether the type of the frame matches a type of a frame transmitted as a receipt acknowledgement to the first frame, with reference to the type information included in the frame, the SN determination unit may determine whether the sequence number included in the frame matches the sequence number associated with the identifier of the receiving device, with reference to the SN storage unit, and when the frame determination unit determines that the type of the frame matches the type of the frame transmitted as the receipt acknowledgement to the first frame and the SN determination unit determines that the sequence number included in the frame matches the sequence number associated with the identifier of the receiving device, the relay determination unit may determine that the frame has been transmitted by the relay device.

According to the above configuration, the sequence number in the present invention serves as (1) an identifier of each frame, (2) associating data frame (namely, the first frame) and the ACK frame (namely, the receipt acknowledgement of the first frame), and (3) indicating a destination receiving device toward which the data frame has been transmitted or the ACK frame corresponding to the data frame. Thus, the receiving device determines, from the type information included in the frame, whether the type of the frame is ACK frame. If it is determined that the frame is an ACK frame, the receiving device can know the destination toward which the data frame to which the ACK frame corresponds to has been transmitted. Here, usually, the receiving device does not receive the ACK frame that corresponds to the data frame transmitted toward the own device. This is because the ACK frame corresponding to the data frame transmitted toward the own device is a frame that should be transmitted by the receiving device itself. Thus, when the relay determination unit receives the ACK frame corresponding to the data frame the destination of which is the own device, the relay determination unit can determine that the received frame has been transmitted by a wireless device other than the own device, i.e., the relay device, on behalf of the own device.

A transmitting device according to an aspect of the present invention is a transmitting device for transmitting a first frame to a receiving device via a relay device in a wireless communication system in which, between the transmitting device and the receiving device, wireless communication is performed in an active period and the wireless communication is interrupted in an inactive period, the transmitting device including: an SN storage unit configured to store therein an identifier unique to the receiving device and a sequence number associated with the identifier; a selection unit configured to select the sequence number associated with the identifier of the receiving device, as a sequence number to be assigned to the first frame; a frame generation unit configured to generate the first frame which includes the selected sequence number; and a transmitting unit configured to transmit the generated first frame.

According to the above configuration, the transmitting device generates and transmits the ACK frame in which the destination is associated with a sequence number to the receiving device. As a result, even in the ACK frame (namely, a frame that is transmitted as the receipt acknowledgement to a frame) such as of IEEE 802.15.4 in which no Addressing Field indicative of the destination of the frame is included, the receiving device can determine a destination receiving device toward which the received ACK frame, to which the receipt acknowledgement corresponds, has been transmitted. This allows the receiving device to determine whether the received frame has been transmitted by the relay device. If it is determined, as a result, that the received frame has been relayed, relay of a transmission frame with low delay is possible by setting the extended active period which is a period in which at least the own device is communicable.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments according to the present invention will be described, with reference to the accompanying drawings.

It should be noted that the embodiments described below are each merely an illustration of the present invention. Values, shapes, materials, components, disposition or a form of connection between the components, steps, and the order of the steps are merely illustrative, and are not intended to limit the present invention. Moreover, among components of the below non-limiting embodiments, components not set forth in the independent claims indicating the top level concept of the present invention will be described as optional components.

Embodiment 1

Figure 1:
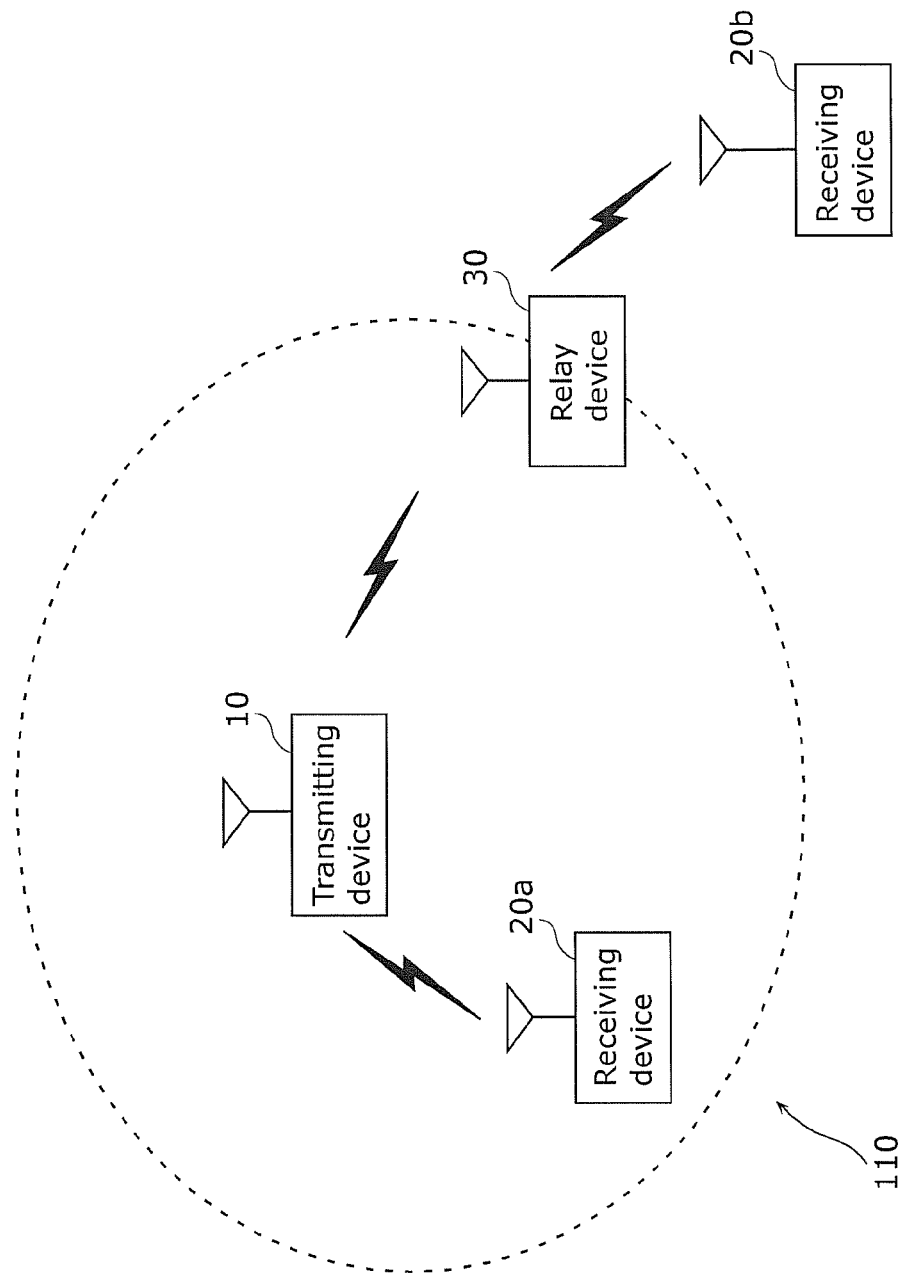
FIG. 1 is a diagram showing a network configuration according to embodiments 1 and 2 of the present invention and variations thereof.

FIG. 1 is a diagram showing an example of a wireless communication system 110 according to an embodiment 1 of the present invention. The wireless communication system 110 is, typically, a wireless ad-hoc network. In FIG. 1, a transmitting device 10 is wirelessly connected to a receiving device 20a and a relay device 30. A receiving device 20b is located at a position where direct communication with the transmitting device 10 cannot be performed, and is connected to the transmitting device 10 via the relay device 30. Here, examples of the wireless connection include connections according to a specified low power radio complying with the IEEE 802.15.4 standard, the IEEE 802.11 standard, and ARIB (Association of Radio Industries and Businesses).

It should be noted that, hereinafter, the receiving device 20a and the receiving device 20b will collectively be referred to as a receiving device 20.

The transmitting device 10, the receiving device 20, and the relay device 30 are any wireless devices from among a control device and terminal devices in the wireless communication system, for example, as shown in FIG. 25 in which the wireless communication is performed in an active period and the wireless communication is interrupted in an inactive period. Hereinafter, the wireless device that transmits a data frame (hereinafter, also referred to as a first frame) will be referred to as a transmitting device. The wireless device that is a destination of the data frame transmitted from the transmitting device will be referred to as a receiving device. In addition, the wireless device that relays the data frame between the transmitting device and the receiving device will be referred to as a relay device.

The transmitting device 10, the receiving device 20a, the receiving device 20b, and the relay device 30 each acquire the active period and the inactive period from control information included in a beacon frame transmitted from the control device.

Here, the active period is a period determined for each wireless device (for example, each of the transmitting device 10, the receiving device 20a, the receiving device 20b, and the relay device 30), and is a period in which each wireless device turns the communication functionality to ON and performs communication with other wireless device. The inactive period is a period determined for each wireless device, and is a period in which each wireless device turns the communication functionality to OFF and does not perform communication with other wireless device.

All the wireless devices included in the wireless communication system 110 use the beacon frame to synchronize the active period and the inactive period, and thus, in principle, the active periods and the inactive periods used by all the wireless devices match each other. For example, the beacon frame transmitted by the transmitting device 10 is instantly relay forwarded by the relay device 30 and reaches the receiving device 20b. This matches the active periods and the inactive periods of all the wireless devices. Alternatively, the synchronization is possible by the transmitting device 10 increasing transmit power when transmitting the beacon frame so that the beacon frame directly reaches the receiving device 20b.

FIG. 2 is a diagram showing a relationship between a beacon period 1006, the active period 1007, and an inactive period 1008. In FIG. 2, the beacon period includes the active period 1007 and the inactive period 1008. The active period 1007 is a period in which the control device 1001 and the terminal devices 1002 to 1004 perform communication therebetween. The inactive period 1008 is a period in which no communication is performed. The control device and the terminal devices can reduce the power consumption by going to the sleep state in the inactive period 1008. In addition, even in the active period 1007, the terminal device that does not perform the communication can reduce the power consumption by going to the sleep state.

The control device 1001 and the terminal devices 1002 to 1004 use the active period in a shared manner. The beginning of the active period is used by the control device 1001 to broadcast the beacon frame. In other words, the beacon period 1006 is a sum of the active period 1007 and the inactive period 1008. The remaining active period after the control device 1001 has broadcast the beacon frame is used for the communication between the control device 1001 and the terminal devices 1002 to 1004.

For example, CSMA can be used as a method of the wireless communication. Alternatively, the active period may be divided into a plurality of time slots so as to be used by slot CSMA and TDMA in a shared manner. For example, in the IEEE 802.15.4 standard, the time slots of the first half of the active period are used for contention access by CSMA, and each of the time slots of the last half of the active period is each allocated to a wireless device for use, and the communication is performed. The beacon frame includes control information relating to the frame, such as the number of time slots of the active period, allocation of the time slots, the length of the active period, the length of the inactive period, and a time until transmission of the next beacon frame.

Next, problems caused by applying the conventional technique to the wireless communication system 110, in which the wireless communication is performed in the active period and the wireless communication is interrupted in the inactive period, will be described in detail, with reference to FIG. 3.

Figure 3:
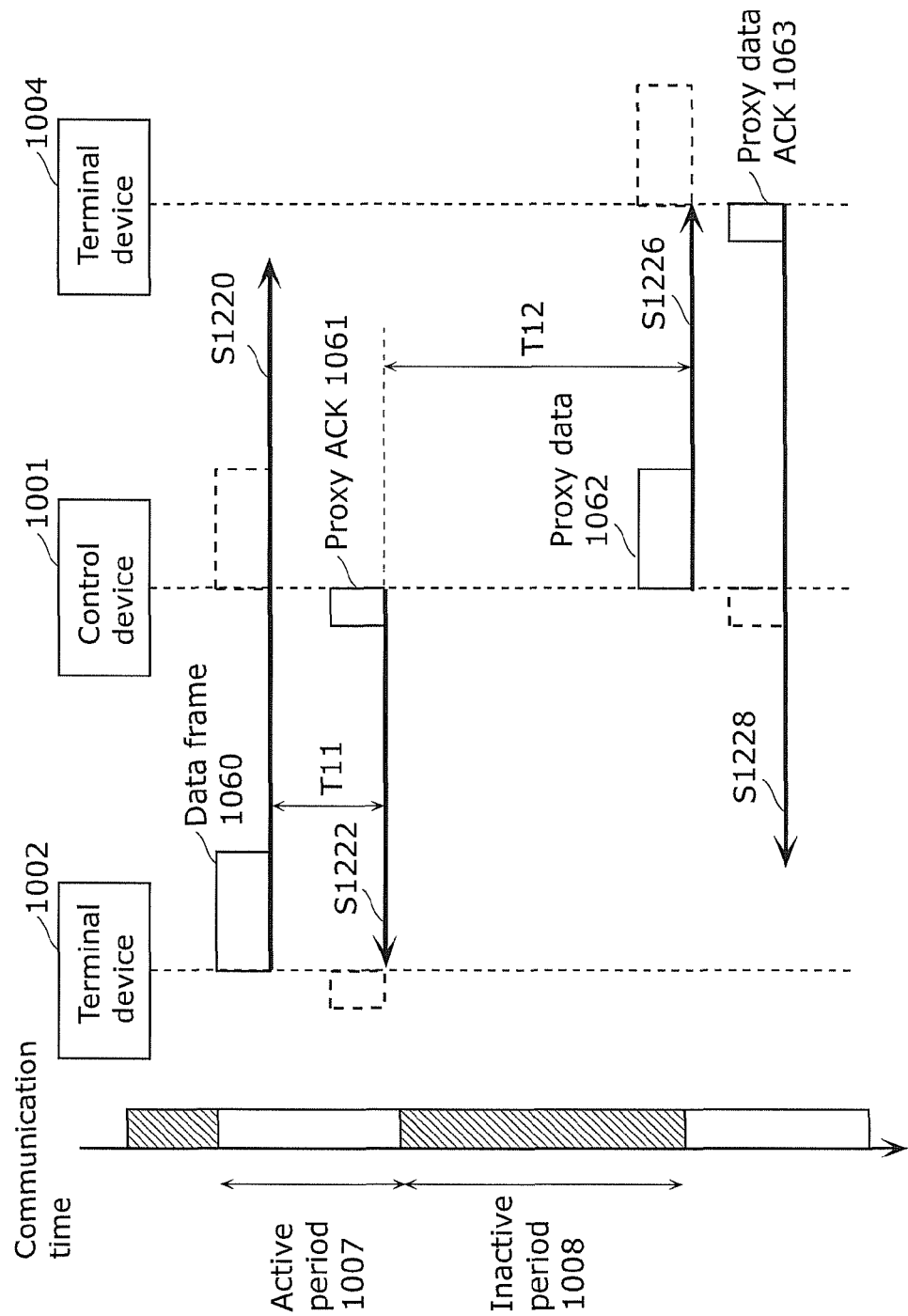
FIG. 3 is a sequence diagram showing a frame relay taking into account the active period and the inactive period in Background Art section.

FIG. 3 is a sequence diagram illustrating the problems with the conventional technique.

Here, the terminal device 1002 and the terminal device 1004 are each located at which the communication with the control device 1001 is allowed. It is assumed that the terminal device 1002 and the terminal device 1004 are located away from each other, and thus are located at which the direct communication therebetween is not allowed. Showing the correspondence between the terminal device 1002, the control device 1001, and the terminal device 1004 for roles in the wireless communication, for example, in the wireless communication system 110 shown in FIG. 1, the terminal device 1002 corresponds to the transmitting device 10, the control device 1001 corresponds to the relay device 30, and the terminal device 1004 corresponds to the receiving device 20b.

In the active period 1007, the terminal device 1002 transmits a data frame 1060 toward the terminal device 1004. The terminal device 1002 and the terminal device 1004 are not in the range where the direct communication therebetween is allowed as described above, and thus the terminal device 1004 cannot receive the data frame 1060 (S1220). Thus, an acknowledgement (ACK) frame corresponding to the data frame 1060 is not transmitted from the terminal device 1004.

On the other hand, the control device 1001 is in the range where the direct communication thereto from the terminal device 1002 is allowed, and thus receives the data frame 1060. Then, the control device 1001 parses the received data frame 1060 to determine whether the destination address is the own address. As a result, the destination is the terminal device 1004, and thus the control device 1001 temporarily stores the data frame 1060 in a buffer in the control device 1001.

Next, the control device 1001 waits for the wait time T11 for the acknowledgement (ACK) frame corresponding to the data frame 1060 transmitted by the terminal device 1002. If the control device 1001 fails to receive the ACK frame from the terminal device 1004 in the wait time T11, the control device 1001 determines that the data frame 1060 has failed to reach the terminal device 1004. The control device 1001 transmits to the terminal device 1002 a proxy ACK frame 1061 which is proxy acknowledgement corresponding to the data frame 1060, on behalf of the terminal device 1004 (S1222).

The terminal device 1002 having received the proxy ACK frame 1061 determines that the data frame 1060 has been transmitted from the terminal device 1004, and ends the transmission process of the data frame 1060.

Next, the control device 1001 relays the data frame by transmitting the data frame 1060 stored in the buffer in the control device 1001 to the terminal device 1004 as a proxy data 1062. Here, when the time enters the inactive period 1008 prior to or during the transmission, the control device 1001, the terminal device 1002, and the terminal device 1004 go to the sleep state. Thus, the control device 1001 cannot relay the frame until the next active period starts (during T12 shown in FIG. 3). Thus, delay occurs.

Moreover, the terminal device 1002 has determined in step S1222 that the transmission of the data frame 1060 to the terminal device 1004 is already completed, and thus is likely to start the next application processing. In other words, a failure due to mismatch in the internal state can occur across the entirety of the wireless communication system.

Hereinafter, the transmitting device 10, the receiving device 20, and the relay device 30 according to the embodiment 1 of the present invention which can achieve the frame relay where no delay occurs will be described.

Figure 4:
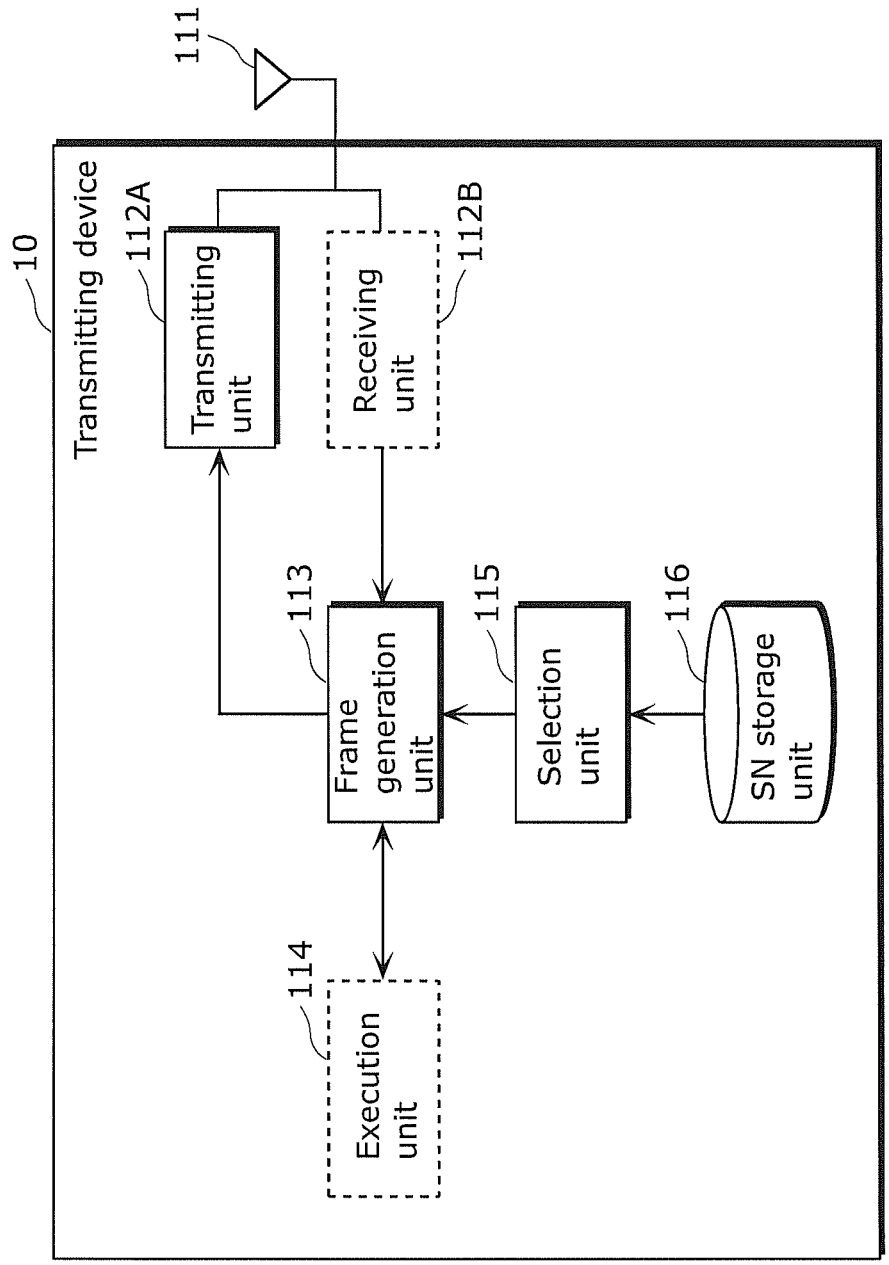
FIG. 4 is a block diagram showing a configuration of a transmitting device according to the embodiment 1 of the present invention.

FIG. 4 is a diagram showing an example of a functional block of the transmitting device 10 according to the present embodiment. Here, the transmitting device 10 is a transmitting device included in the wireless communication system 110. In the wireless communication system 110, the relay device 30 relays the first frame that is transmitted toward the receiving device 20 from the transmitting device 10.

As shown in FIG. 4, the transmitting device 10 includes a transmitting unit 112A, a receiving unit 112B, a frame generation unit 113, an execution unit 114, a selection unit 115, and an SN storage unit 116.

The transmitting unit 112A transmits a frame generated by the frame generation unit 113 via an antenna 111 which is an antenna through which the wireless communication is performed. It should be noted that, more specifically, the transmitting unit 112A modulates or demodulates a frame signal, and has functionality of a media access control such as CSMA.

The receiving unit 112B receives the ACK frame and the like via the antenna 111.

The frame generation unit 113 has functionality of generating and parsing various frames such as the data frame, the ACK frame, the beacon frame, and a management frame. For example, the frame generation unit 113 generates a data frame (the first frame) which includes a sequence number selected by the selection unit 115.

The execution unit 114 is a control unit for services utilizing the wireless communication system 110. For example, the execution unit 114 performs processing in a home network, such as remote control of electric household appliances and cooperative control for energy conservation among electric household appliances.

The SN storage unit 116 stores therein an identifier unique to the receiving device and a sequence number (SN) associated with the identifier. For example, the SN storage unit 116 stores therein the SN and an address of the wireless device (for example, media access control (MAC) address) in association. It should be noted that the SN storage unit 116 may store therein an identifier unique to the relay device or the like in addition to the receiving device, and a sequence number in association. The SN storage unit 116 will be described in detail, with reference to FIG. 6.

The selection unit 115 selects the sequence number corresponding to the identifier of the receiving device, as a sequence number to be assigned to the first frame. It should be noted that the selection unit 115 may select the sequence number corresponding to the identifier of the relay device.

Figure 5A:
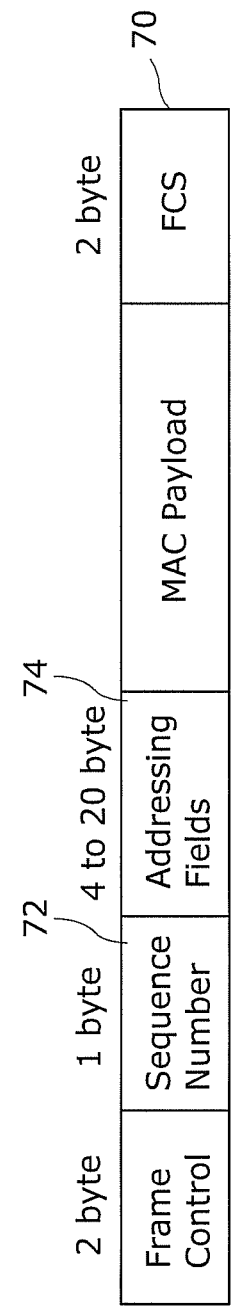
FIG. 5A is a diagram showing a data frame configuration in the 802.15.4 standard.
Figures 5B, 6A, 6B:
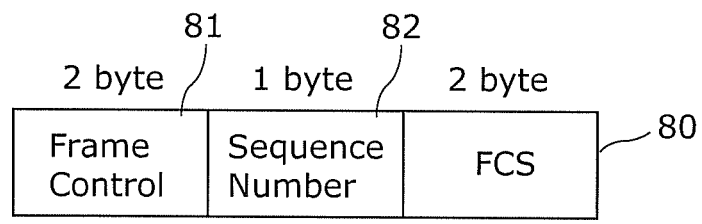
FIG. 5B is a diagram showing an ACK frame configuration in the 802.15.4 standard.
FIG. 6A is a diagram showing an example of a data structure of an SN storage unit included in the transmitting devices according to the embodiments 1 and 2 of the present invention and the variations thereof.
FIG. 6B is a diagram showing another example of the data structure of the SN storage unit included in the transmitting devices according to the embodiments 1 and 2 of the present invention and the variations thereof.

FIG. 6A and FIG. 6B are diagrams showing data structures of an SN storage unit 116a and an SN storage unit 116b, respectively, which are two examples of the SN storage unit 116 shown in FIG. 4. In the SN storage unit 116, "SN (sequence number)" and a "device address" which is an identifier of the wireless device are stored in association. It should be noted that the SN storage unit 116 may additionally store therein information other than the above.

The SN storage unit 116a shown in FIG. 6A and the SN storage unit 116b shown in FIG. 6B are different in the way how the sequence number is used. In other words, in the SN storage unit 116a, a plurality of device addresses 86 are associated with a group of sequence numbers. On the other hand, in the SN storage unit 116b, a device address 88 is associated with a group of sequence numbers. The SN storage unit 116 may employ either data structure.

It should be noted that the device address is an identifying address unique to the wireless device, examples of which include 48-bit MAC address, a short address of the IEEE 802.15.4, and an EUI (Extended Unique Identifier)-64 address.

The sequence number is a number assigned to a frame such as the data frame and the ACK frame, as shown in FIG. 5A and FIG. 5B which are diagrams showing frame configurations of the 802.15.4 standard. A common sequence number is included in the data frame which is to be transmitted from the transmitting device toward the receiving device, and in the ACK frame which is to be transmitted from the receiving device toward the transmitting device as the acknowledgement to the data frame. The identify of the sequence number allows the wireless device to associate the data frame and the ACK frame.

FIG. 5A shows a configuration of a data frame 70 in the IEEE 802.15.4 standard. Frame Control is set to information indicating that the type of frame is data frame. Sequence Number 72 is set to a sequence number. Addressing Fields 74 is set to the identifiers of the wireless devices to or from which the data frame 70 is to be transmitted.

FIG. 5B shows a configuration of an ACK frame 80 in the IEEE 802.15.4 standard. Frame Control 81 is set to information indicating that the type of frame is ACK frame. Sequence Number 82 is set to the same sequence number as that set to a corresponding data frame. In the 802.15.4 standard, there is no Addressing Field in ACK frame and the ACK frame is generated using the same sequence number as that of the data frame. The wireless device is allowed to identify, from the sequence number of the ACK frame, which data frame the ACK frame corresponds to.

The SN storage unit 116a shown in FIG. 6A associates a plurality of wireless devices with a group of sequence numbers like 1 to 63. In contrast, the SN storage unit 116b shown in FIG. 6B associates a wireless device with a group of sequence numbers. The sequence number is incremented each time the transmitting device 10 transmits a frame. As shown in FIGS. 6A and 6B, the SN storage unit 116 stores therein a group of consecutive sequence numbers, the upper and lower limits of which are specified, and the device address in association. The sequence number is incremented in each group and when reached the upper limit, goes back to the lower limit and used.

It should be noted that the transmitting device 10 according to the present embodiment achieves the same advantageous effects of the present invention without the execution unit 114. Specifically, if an execution device that includes the execution unit 114 exists external to the transmitting device 10, the transmitting device 10 can transmit the received data frame to the execution device and, if necessary, acquire a result of processing from the execution device.

It should be noted that the transmitting device 10 according to the present embodiment achieves the same advantageous effects of the present invention without the receiving unit 112B. Specifically, when generating the first frame that includes a sequence number corresponding to the destination of the frame, there is no need for the transmitting device 10 to receive the frame from other wireless device.

Figure 7:
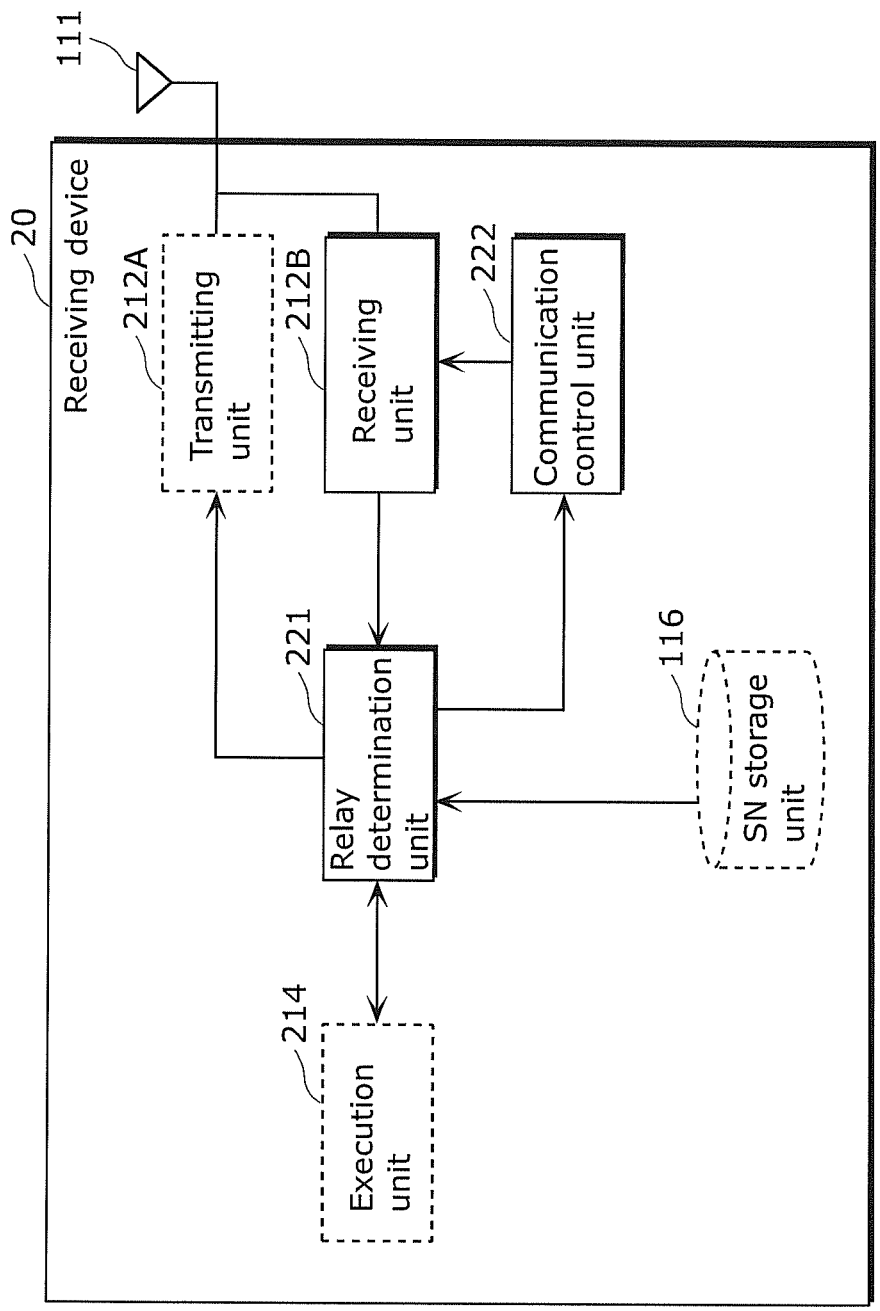
FIG. 7 is a block diagram showing a configuration of a receiving device according to the embodiment 1 of the present invention.

FIG. 7 is a diagram showing an example of a functional block of the receiving device 20 according to the embodiment 1 of the present invention. Here, the receiving device 20 is a receiving device included in the wireless communication system 110. In the wireless communication system 110, the relay device 30 relays the first frame that is transmitted toward the receiving device 20 from the transmitting device 10. It should be noted that the same reference signs will be used in FIG. 7 to refer to the same components shown in FIG. 4 and the description will be omitted.

As shown in FIG. 7, the receiving device 20 includes a transmitting unit 212A, a receiving unit 212B, a relay determination unit 221, a communication control unit 222, the SN storage unit 116, and an execution unit 214.

The transmitting unit 212A is a communication interface which transmits toward the transmitting device 10 an ACK frame (hereinafter, also referred to as a second frame) as acknowledgement to the first frame transmitted from the transmitting device 10. In the present embodiment, an ACK generation unit (not shown) generates the second frame. It should be noted that the communication functionality of the transmitting unit 212A is the same as that of, for example, the transmitting unit 112A

The receiving unit 212B is a communication interface which receives the frame transmitted from the transmitting device 10. The communication functionality of the receiving unit 212B is the same as that of, for example, the receiving unit 112B.

Based on the sequence number included in the received frame, the relay determination unit 221 determines whether the frame has been transmitted from the relay device 30, the details of which will be described below.

The SN storage unit 116 is a storage unit which stores therein the same information as that stored in the SN storage unit 116 included in the transmitting device 10. In other words, the SN storage unit 116 stores, in association, an identifier unique to the receiving device 20 and a sequence number that can be assigned to the receiving device 20 by the transmitting device 10.

If it is determined that the received frame is the frame that has been transmitted from the relay device 30, the communication control unit 222 sets, in the inactive period subsequent to the active period, an extended active period which is a period in which the own device can continue to perform the communication even after the end of the current active period that is for the receiving device 20. This is to enable the completion of reception of the first frame relayed by the relay device 30 by continued reception in the extended active period even after the end of the active period. It should be noted that the wireless communication system 110 determines the active period by instructions by the beacon frame broadcast by the control device as described above.

As with the execution unit 114, the execution unit 214 controls services utilizing the wireless communication system 110 remotely controlling electric household appliances or cooperatively controlling energy conservation among electric household appliances in the home network.

It should be noted that the receiving device 20 according to the present embodiment achieves the same advantageous effects of the present invention without the execution unit 214. Specifically, if an execution device that includes the execution unit 214 exists external to the receiving device 20, the receiving device 20 can transmit the received data frame to the execution device and, if necessary, acquire a result of processing from the execution device.

Moreover, the receiving device 20 according to the present embodiment achieves the same advantageous effects of the present invention without the SN storage unit 116. Specifically, the receiving device 20 can acquire the same data as that stored in the SN storage unit 116, via an external storage medium such as SD card, or a network.

Moreover, the receiving device 20 according to the present embodiment achieves the same advantageous effects of the present invention without the transmitting unit 212A. Specifically, the receiving device 20 does not need to transmit a frame to other wireless device for the determination as to whether the extended active period should be set.

Figure 8:
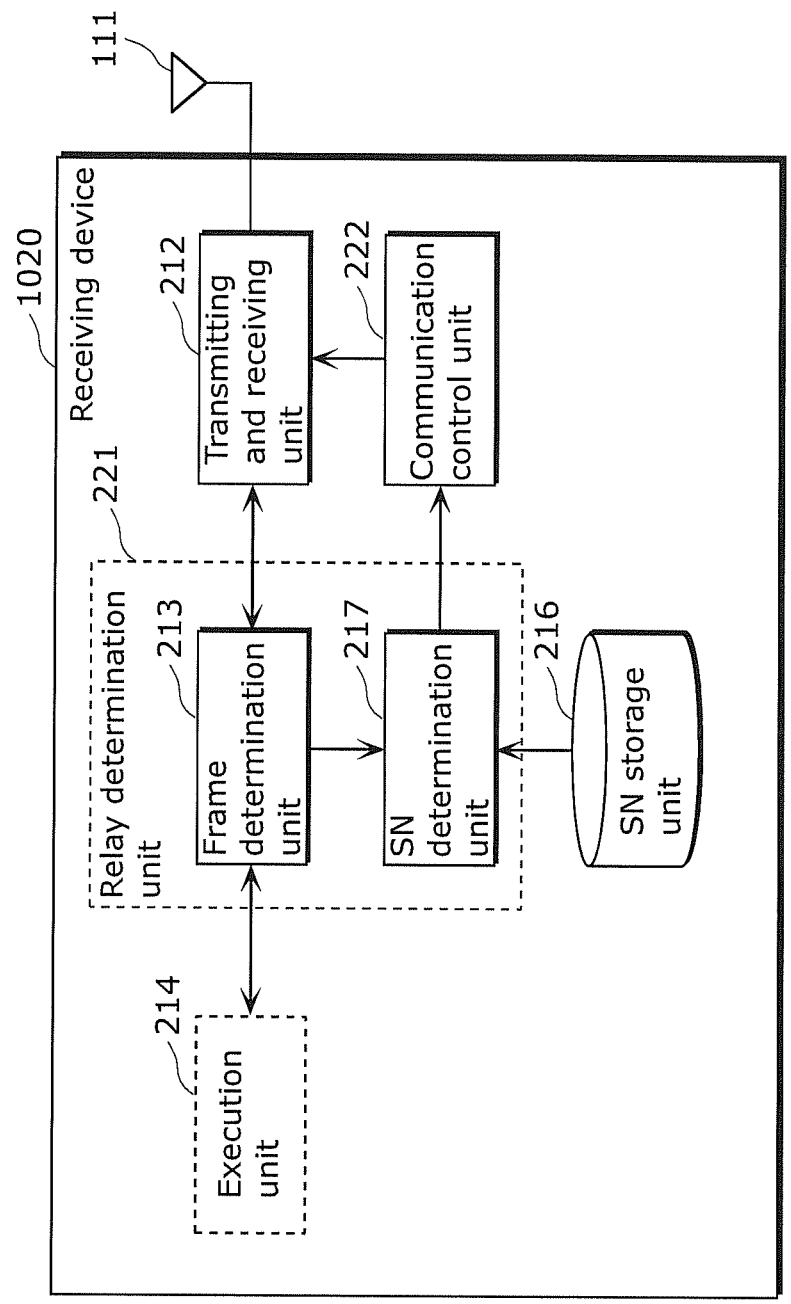
FIG. 8 is a block diagram showing another configuration of the receiving device according to the embodiment 1 of the present invention.

It should be noted that the receiving device 20 according to the present embodiment can also be embodied with other configuration. FIG. 8 shows a configuration of a receiving device 1020 according to a variation of the present embodiment.

As shown in FIG. 8, the receiving device 1020 includes a transmitting and receiving unit 212, a relay determination unit 221, an SN storage unit 216, the communication control unit 222, and an execution unit 214. It should be noted that the same reference signs will be used to refer to the same components shown in FIG. 7 and the detailed description will be omitted.

In the variation, the transmitting unit 212A and the receiving unit 212B are grouped together as the transmitting and receiving unit 212. The functionality of the transmitting and receiving unit 212 is the same as those of the transmitting unit 212A and the receiving unit 212B, respectively.

Moreover, the relay determination unit 221 includes a frame determination unit 213 and an SN determination unit 217.

The frame determination unit 213 generates and parses various frames such as the data frame, the ACK frame, the beacon frame, and the management frame. In the variation, the frame determination unit 213 generates the ACK frame and causes the transmitting and receiving unit 212 to transmit the ACK frame toward the transmitting device 10. Moreover, the frame determination unit 213 determines whether a frame received by the transmitting and receiving unit 212 is the second frame. It should be noted that, as described above, the frame includes a sequence number assigned to the frame by the transmitting device 10 and type information indicating the type of the frame.

Specifically, the frame determination unit 213 determines whether the type of the frame matches the type of a frame to be transmitted as the receipt acknowledgement of the first frame, with reference to the type information included in the frame. For example, describing the IEEE 802.15.4 standard with reference to FIG. 5, the frame determination unit 213 can know the type of the frame, with reference to Frame Control in the frame. Thus, the frame determination unit 213 determines whether Frame Control of the frame matches Frame Control 81 of the ACK frame 80. Here, if the result of matching is affirmative, either one of the following is conceivable: the frame is the second frame; and the frame is a third frame transmitted by a relay device described below, on behalf of the second frame.

The SN determination unit 217 determines whether a sequence number included in the received frame matches a sequence number associated with the identifier of the receiving device 20.

Here, if the frame determination unit 213 determines that the matching is affirmative and the SN determination unit 217 determines that the matching is affirmative, the relay determination unit 221 determines that the frame has been transmitted by the relay device In other words, the sequence number in the present invention serves as (1) an identifier of each frame, (2) associating data frame (namely, the first frame) and the ACK frame (namely, the receipt acknowledgement of the first frame), and (3) indicating a destination receiving device toward which the data frame has been transmitted or the ACK frame corresponding to the data frame. Thus, the receiving device 20 determines, from the type information included in the frame, whether the type of the frame is ACK frame. If it is determined that the frame is an ACK frame, the receiving device 20 can know the destination toward which the data frame to which the ACK frame corresponds to has been transmitted. Here, usually, the receiving device 20 does not receive the ACK frame that corresponds to the data frame transmitted toward the own device. This is because the ACK frame corresponding to the data frame transmitted toward the own device is a frame that should be transmitted by the receiving device itself. Thus, when the relay determination unit 221 receives the ACK frame corresponding to the data frame the destination of which is the own device, the relay determination unit 221 can determine that the received frame has been transmitted by a wireless device other than the own device, i.e., the relay device 30, on behalf of the own device.

Figure 9:
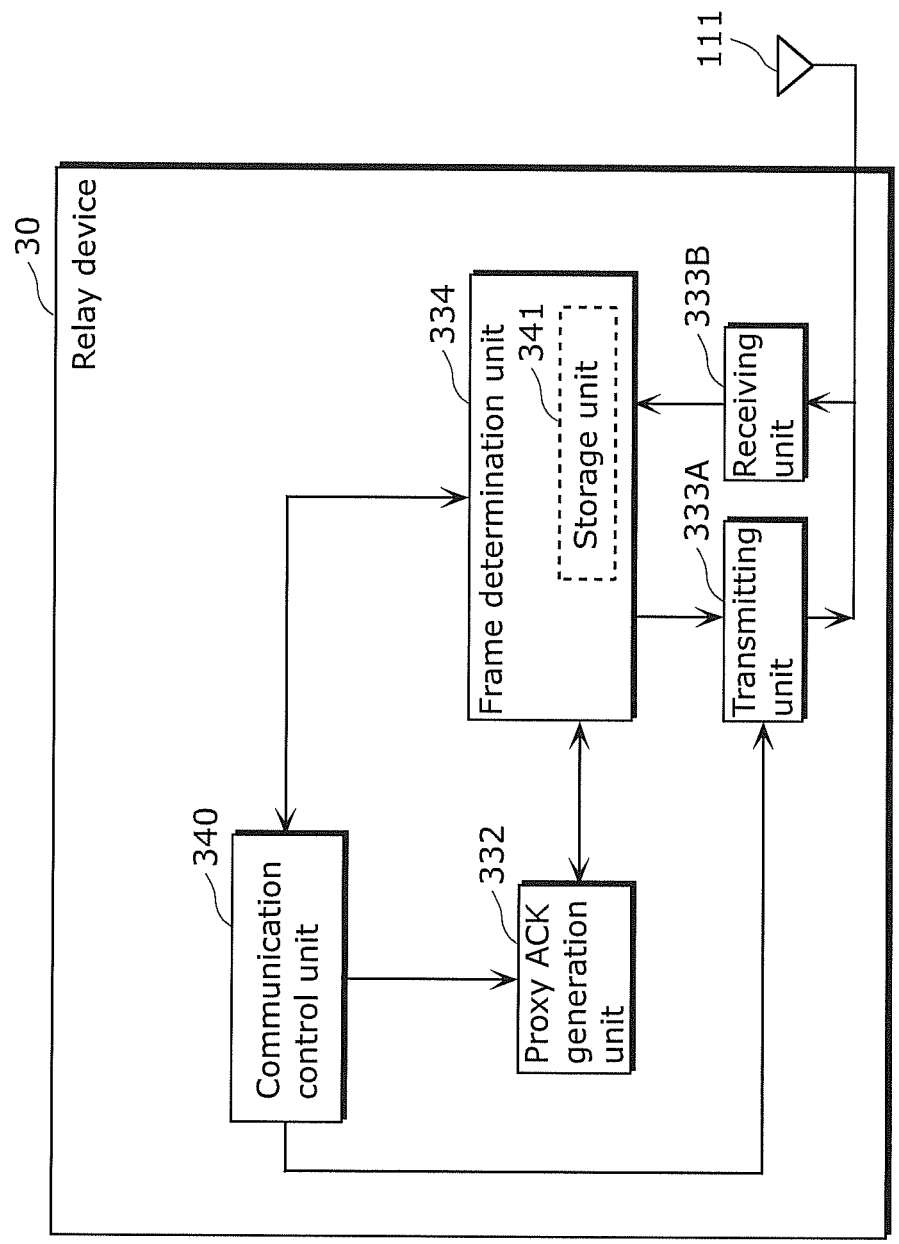
FIG. 9 is a block diagram showing a configuration of a relay device according to the embodiment 1 of the present invention.

Next, FIG. 9 is a diagram showing an example of a functional block of the relay device 30 according to the embodiment 1 of the present invention. The relay device is a relay device that is included in the wireless communication system 110 and relays the first frame transmitted toward the receiving device 20 from the transmitting device 10. It should be noted that the same reference signs will be used in FIG. 9 to refer to the same components shown in FIG. 4 and the description will be omitted.

As shown in FIG. 9, the relay device 30 includes a transmitting unit 333A, a receiving unit 333B, a frame determination unit 334, a proxy ACK generation unit 332, and a communication control unit 340.

The transmitting unit 333A is a communication interface for transmitting the frame.

The receiving unit 333B receives a frame transmitted from one of the transmitting device 10 and the receiving device 20 to the other. The transmitting unit 333A and the receiving unit 333B may have the same configurations of, for example, the transmitting unit 112A and the receiving unit 112B, respectively.

The frame determination unit 334 determines whether the frame received by the receiving unit 333B is any of the first frame and the second frame which is transmitted by the receiving device 20 as the receipt acknowledgement to the first frame. If determined that the frame is the first frame, the frame determination unit 334 stores the first frame in a storage unit 341 included in the frame determination unit 334.

If the receiving unit 333B receives the first frame, and does not receive the second frame corresponding to the first frame within a predetermined period starting from the reception of the first frame, the proxy ACK generation unit 332 generates a third frame which is a frame that includes the same information as the information to be included in the second frame and is proxy of the second frame. In other words, referring to FIG. 5B, the type information indicating the ACK frame is specified in Frame Control 81 of the third frame and a sequence number of the first frame stored in the storage unit 341 is specified in Sequence Number 82.

It should be noted that if the proxy ACK generation unit 332 receives the first frame and does not receive the second frame within a predetermined period independent of the time of reception of the first frame, the proxy ACK generation unit 332 may determine to generate the third frame.

If the receiving unit 333B receives the first frame and then does not receive the second frame that corresponds to the first frame within the predetermined period, the communication control unit 340 causes the transmitting unit 333A to transmit the third frame to the transmitting device 10 and the receiving device 20. Moreover, the communication control unit 340 sets, in the inactive period subsequent to the active period, an extended active period which is a period in which the communication is allowed to continue after the end of the active period, and causes the transmitting unit 333A to transmit the first frame stored in the frame determination unit 334 to the receiving device 20 as a fourth frame in the extended active period.

More specifically, if the receiving unit 333B receives the first frame and then does not receive the second frame in the predetermined period, the communication control unit 340 causes the transmitting unit 333A to transmit the third frame to the transmitting device 10 and the receiving device 20, sets the extended active period so that the transmission of the fourth frame is completed in the active period, and causes the transmitting unit 333A to transmit the fourth frame to the receiving device 20.

It should be noted that referring to FIG. 27, the predetermined period corresponds to T11. In other words, the predetermined period is a predetermined period required from when the relay device 30 transmits the first frame to the receiving device 20 to when the relay device 30 receives the second frame.

It should be noted that, if the communication control unit 340 cannot receive, after the reception of the first frame, the second frame within a predetermined period independent of the time of reception of the first frame, the communication control unit 340 may (1) transmit the third frame, (2) transmit the fourth frame, and (3) set the extended active period, as mentioned above.

It should be noted that the relay device 30 according to the present embodiment achieves the same advantageous effects of the present invention without the storage unit 341. Specifically, the relay device 30 can store the first data in a storage medium external to the relay device 30.

Figure 10:
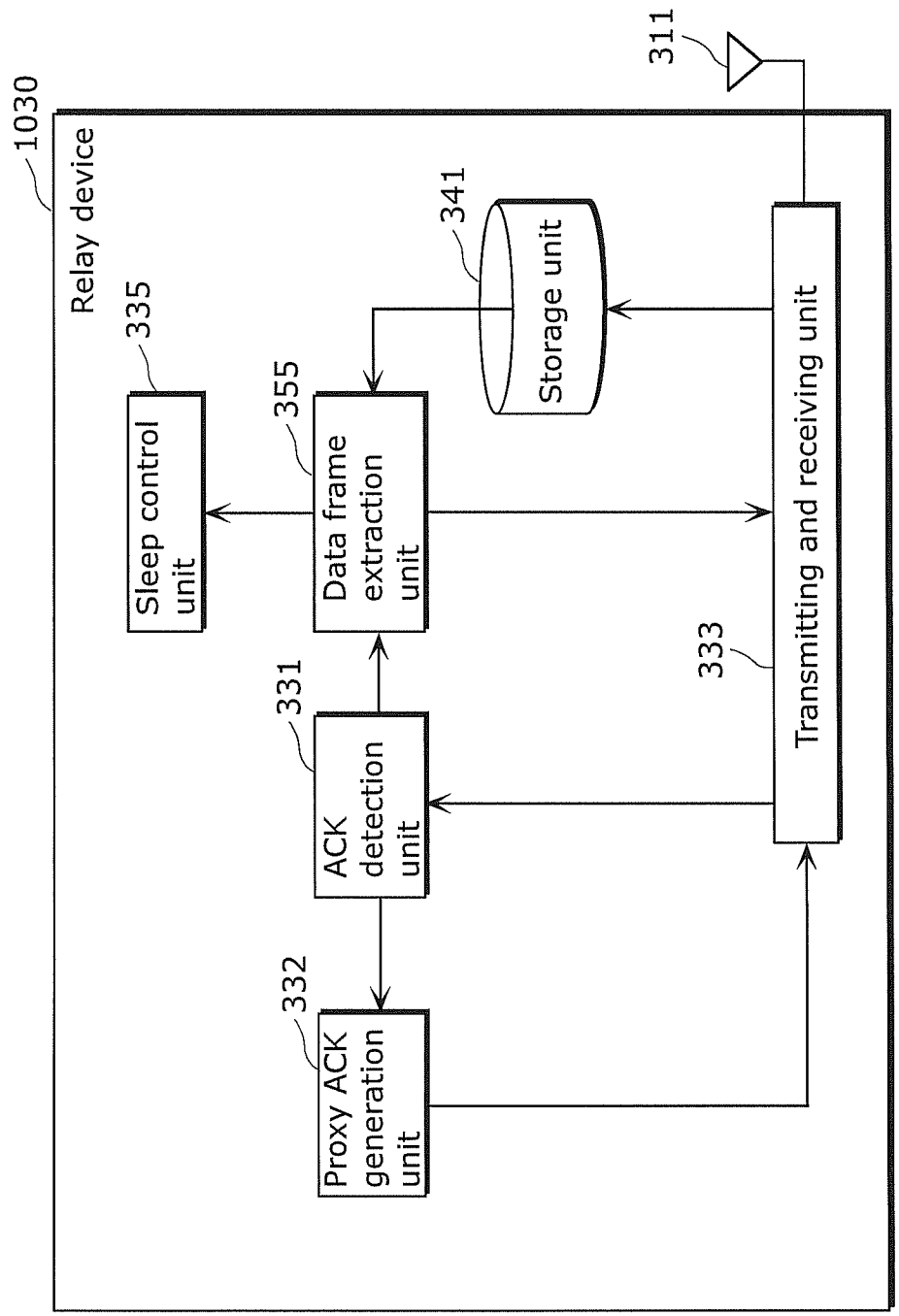
FIG. 10 is a block diagram showing another configuration of the relay device according to the embodiment 1 of the present invention.

FIG. 10 is a block diagram showing a variation of the relay device according to the present embodiment. It should be noted that the same reference signs will be used to refer to the same components shown in FIG. 9 and the detailed description will be omitted.

A relay device 1030 according to the variation includes a transmitting and receiving unit 333, the proxy ACK generation unit 332, an ACK detection unit 331, a data frame extraction unit 355, a sleep control unit 335, and the storage unit 341.

Referring to FIG. 27, the ACK detection unit 331 has functionality of determining whether the transmitting and receiving unit 333 has received an ACK frame within T11 which is a wait time for the ACK frame.

The proxy ACK generation unit 332 has functionality of generating the ACK frame as a proxy ACK frame, on behalf of a destination wireless device, if the transmitting and receiving unit 333 cannot receive the ACK frame within T11 which is the wait time for the ACK frame.

The data frame extraction unit 355 has functionality of extracting a data frame stored in the storage unit 341 and relay forwarding the data frame to the destination wireless device via the antenna 311 after the ACK detection unit 331 has determined that ACK cannot be received within the wait time T11 for the ACK frame and the proxy ACK frame has been transmitted.

The sleep control unit 335 sets the extended active period for the relay device 30 to cause the relay device 30 to continue the transmission and reception of frame for a period of time without going to sleep even after the relay device 30 enters the inactive period.

Next, an operation how the relay device 30 relays the first frame that is transmitted toward the receiving device 20b from the transmitting device 10 will be described with reference to FIG. 11 to FIG. 17. It should be noted that, referring back to FIG. 1, it is assumed that the transmitting device 10 and the receiving device 20b are located away from each other at which the direct communication therebetween is not allowed. It is also assumed that the relay device 30 is located at which the communication with both the transmitting device 10 and the receiving device 20b is allowed.

Figure 11:
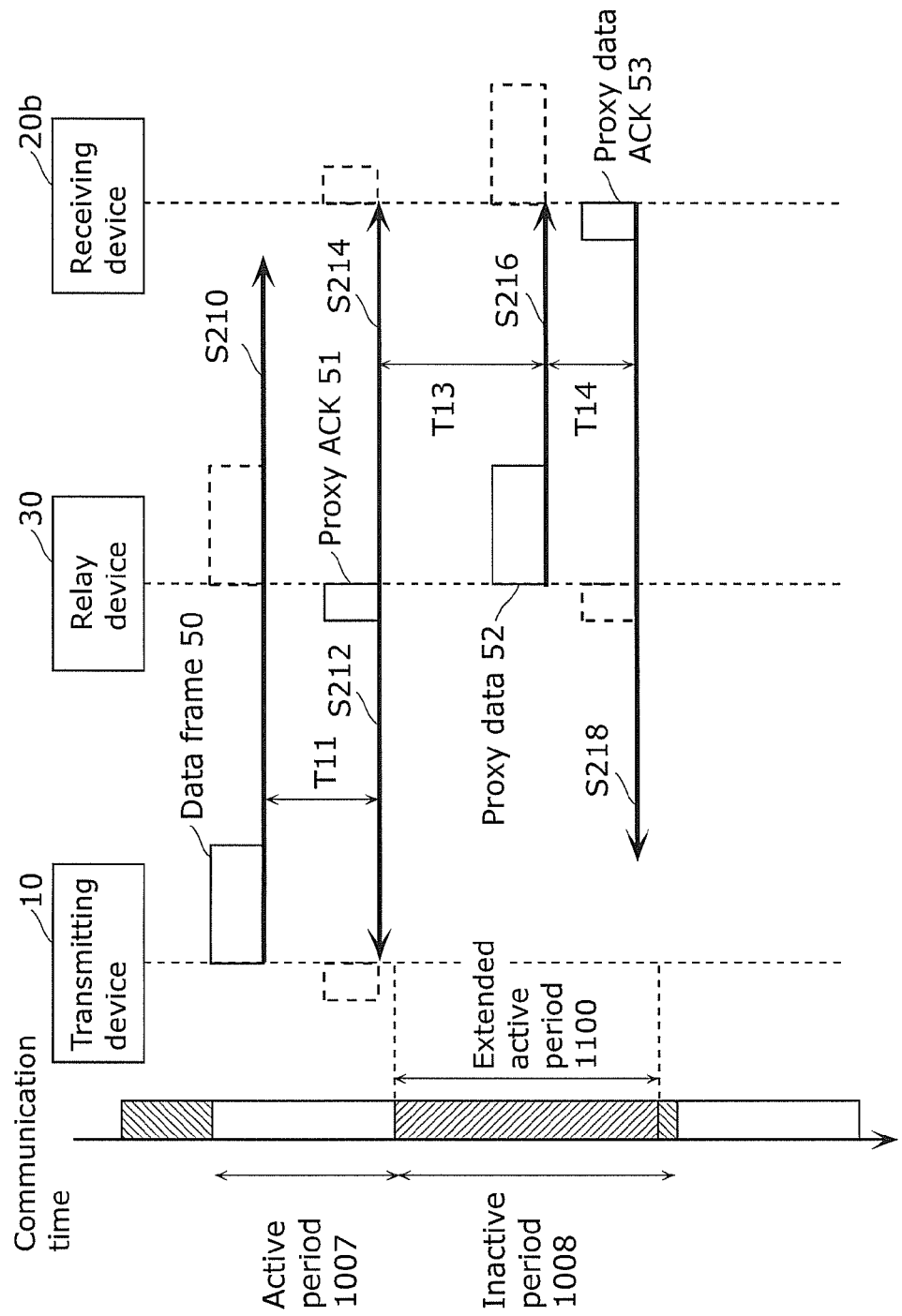
FIG. 11 is a sequence diagram showing an operation of a system according to the embodiment 1 of the present invention.

FIG. 11 is a sequence diagram showing operations of the transmitting device 10, the receiving device 20b, and the relay device 30 according to the embodiment 1. FIG. 11 shows the communication time of the wireless communication system 110 in time series in the vertical direction. As mentioned above, the active period 1007 and the inactive period 1008 are repeated in the wireless communication system 110.

Here, as described above, the receiving device 20b cannot directly receive a data frame 50 that has been transmitted from the transmitting device 10 toward the receiving device 20b (S210). Thus, if the relay device 30 waits for the wait time T11 for an ACK frame from the receiving device 20b and then cannot receive the ACK frame, the relay device 30 transmits a proxy ACK frame 51. The proxy ACK frame 51 is received by the transmitting device 10 and the receiving device 20b (in S212 and S214, respectively).

Next, the relay device 30 and the receiving device 20b each set, in the inactive period 1008 subsequent to the end of the current active period 1007, an extended active period 1100 which is a period in which each device is communicable. Specifically, the relay device 30 sets the extended active period 1100 so that a period in which the relay device 30 is communicable continues at least until the completion of transmission of a proxy data frame 52 (hereinafter, also referred to as proxy data or a fourth frame). Moreover, the receiving device 20b sets the extended active period 1100 so that a period in which the receiving device 20b is communicable continues at least until the completion of reception of the proxy data frame 52. In this manner, the receiving device 20b can complete the reception of the proxy data 52 (S216).

Then, the receiving device 20b transmits to the relay device 30 a proxy data ACK frame 53 (hereinafter, also referred to as proxy data ACK or a fifth frame) which is acknowledgement to the proxy data.

It should be noted that, in FIG. 11, a time period T13 from when the relay device 30 transmits the proxy ACK 51 to when the relay device 30 subsequently transmits the proxy data 52 is about a few milliseconds. The length of T13 is determined depending on radio law constrains, the processing speed of a microcomputer included in the receiving device, and so on.

Moreover, in FIG. 11, a time period T14 from when the relay device 30 transmits the proxy data 52 to when the receiving device 20b transmits the proxy data ACK 53 is determined by standard. Moreover, at the time when the inactive period and the active period are switched, the wireless devices need to receive beacons by standard, and thus cannot transmit or receive other data.

Thus, the relay device 30 and the receiving device 20b each may determine not to set an extended active period longer than T13 plus T14, if, for example, the extended active period cannot be set by the end of the inactive period 1008 which is after the transmission and reception of the proxy ACK 51. In this case, the relay device 30 and the receiving device 20b may start the transmission and reception, respectively, of the proxy data 52 when the subsequent active period arrives.

As described above, in the present embodiment, the relay device 30 and the receiving device 20b each set a period in which each device is communicable until the completion of transmission of the proxy ACK frame 51 and the completion of reception of the proxy ACK frame 51, respectively. Thus, the frame relay is achieved without causing delay.

Next, a processing flow performed by the transmitting device 10 will be described with reference to FIG. 12.

Figure 12:
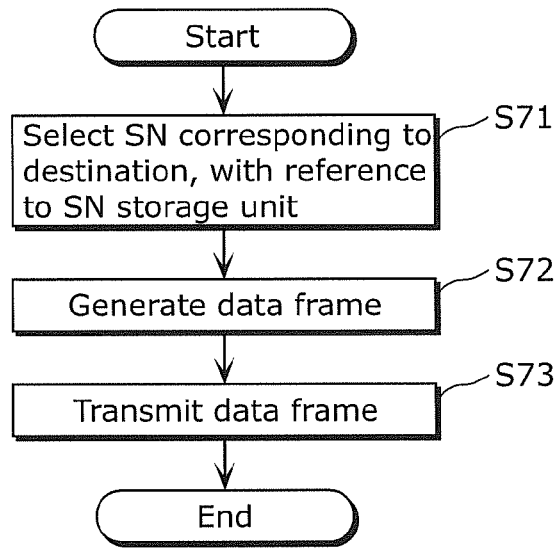
FIG. 12 is a flowchart illustrating an operation of the transmitting device according to the embodiment 1 of the present invention.

FIG. 12 is a flowchart illustrating the processing flow of the transmitting device 10 according to the present embodiment.

First, the selection unit 115 selects an SN corresponding to the receiving device 20b which is destination, with reference to the SN storage unit 116 (S71).

Here, it is assumed that the device address of the receiving device 20b is 0x0011. The selection unit 115 selects, for example, a sequence number 1, with reference to the SN storage unit 116a shown in FIG. 6A (S71).

Next, referring to FIG. 5A, the frame generation unit 113 specifies Sequence Number 72 to 1, and generates a data frame in which Addressing Fields 74 is specified to 0x0011 (S72).

Then, the transmitting device 10 transmits the data frame from the transmitting unit 112A (S73).

Figure 13:
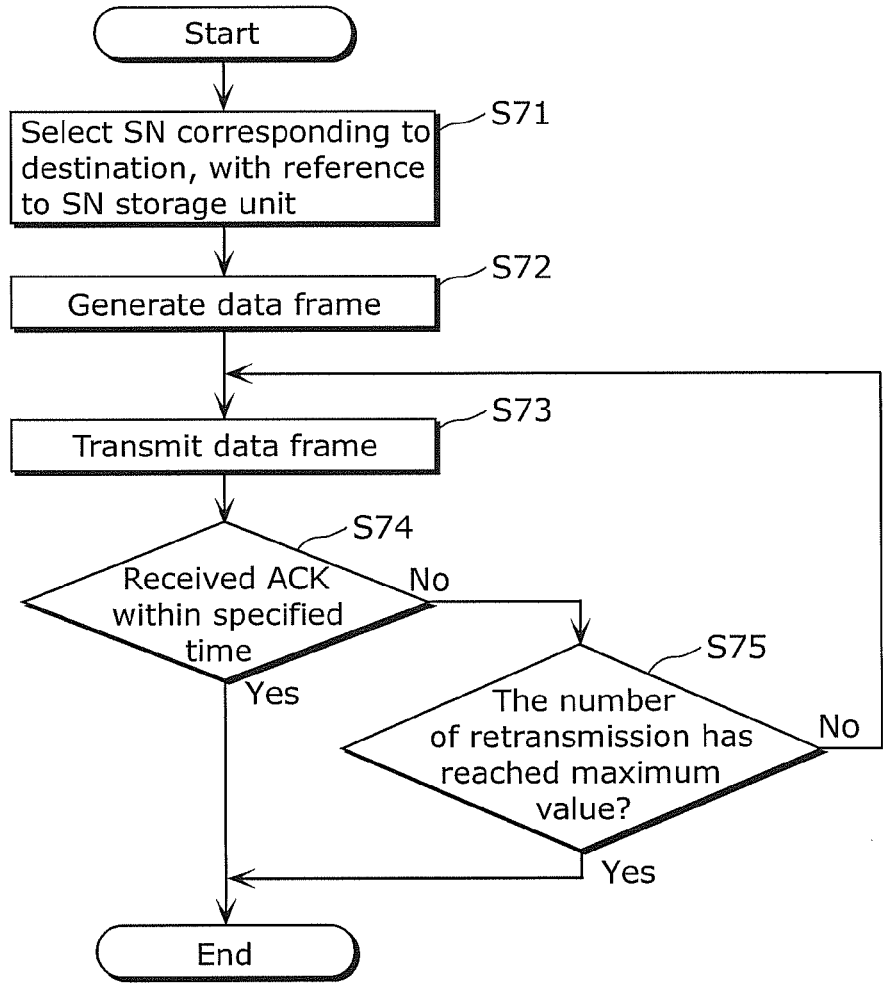
FIG. 13 is a flowchart illustrating another operation of the transmitting device according to the embodiment 1 of the present invention.

It should be noted that, as shown in FIG. 13, the transmitting device 10 determines, after step S73, whether ACK has been received from the receiving device 20b within a specified time (S74), and, if not (No in S74), may repeat retransmission of the data frame 50 (S73) while the number of retransmission is less than a maximum value of a predetermined number of retransmissions (No in S75).

Figure 14:
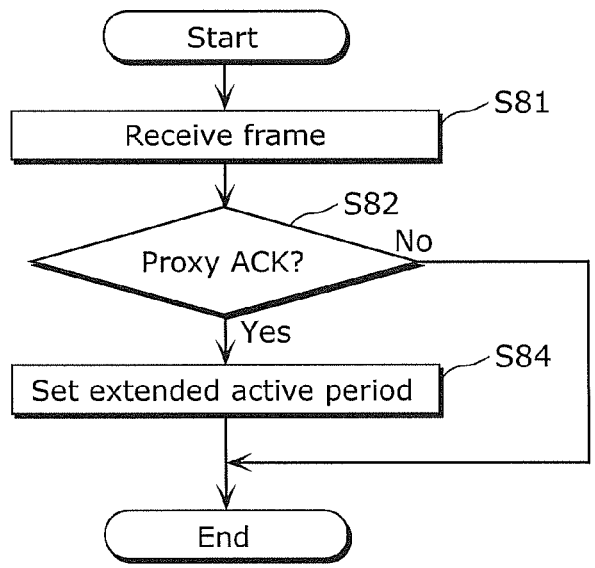
FIG. 14 is a flowchart illustrating an operation of the receiving device according to the embodiment 1 of the present invention.

Next, a processing flow of the receiving device 20b will be described with reference to FIG. 14.

Once the receiving unit 212B receives the frame (S81), the relay determination unit 221 parses the frame to acquire the sequence number. The relay determination unit 221 matches, to the SN storage unit 116b, the device address corresponding to the acquired sequence number to determine whether the destination of the ACK frame is the own device (S82). Here, the destination of the ACK frame is the own device, and thus the receiving device 20b confirms presence of a relay station and then recognizes that the proxy data frame is to be relay forwarded from the relay station. Thus, the communication control unit 222 sets the extended active period so that the receiving device 20b is communicable until the completion of reception of the proxy data frame (S84).

It should be noted that the communication control unit 222 determines, by the time of completion of the next data frame transmission, whether to allow the receiving device 20b to enter the inactive period 1008, and may set the extended active period only if the receiving device 20b is to enter the inactive period, so that the receiving device 20b does not go to sleep for a period of time.

For example, the communication control unit 222 acquires the data size of the proxy data 52 from the relay device 30 and divides the data size by the communication speed between the receiving device 20b and the relay device 30, thereby calculating a time required for the transfer of the proxy data 52. Moreover, the communication control unit 222 can know the end time of the current active period through the beacon frame periodically received by the communication control unit 222. Thus, if a time $T_1$ at which the time required for the completion of reception of the proxy data 52 has been elapsed since the start of the reception of the proxy ACK is an end time $T_2$ of the active period or later, the communication control unit 222 may set the extended active period which is at least a difference between $T_1$ and $T_2$.

Figure 15:
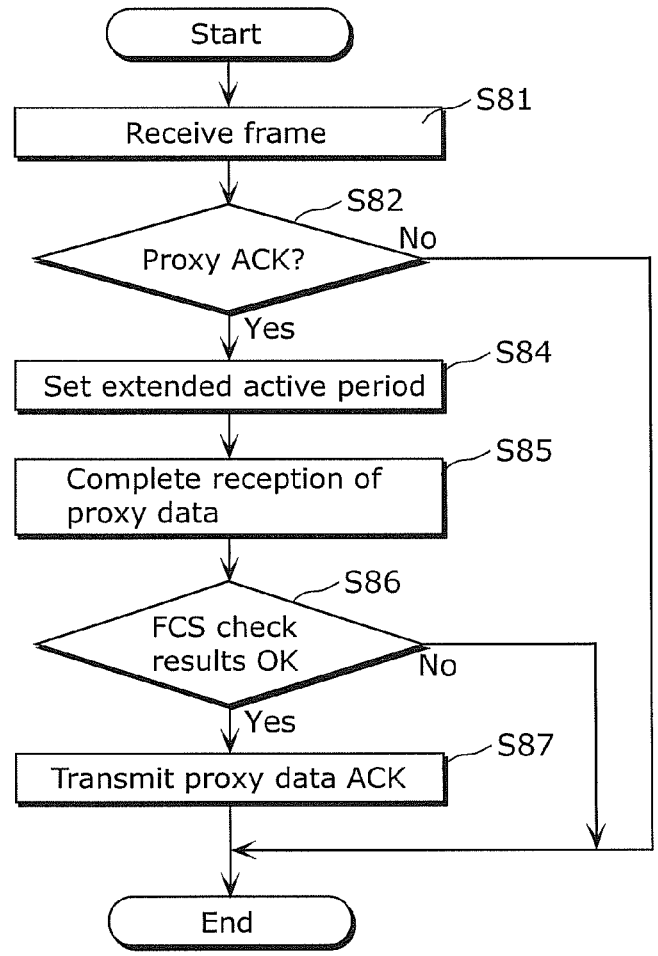
FIG. 15 is a flowchart illustrating another operation of the receiving device according to the embodiment 1 of the present invention.

It should be noted that, as shown in FIG. 15, after the extended active period is set (S84) and the reception of the proxy data 52 is completed (S85), the receiving device 20 may perform FCS (Frame Check Sequence) check on the proxy data 52 (S86). In this case, only when the proxy data 52 is successfully received (Yes in S86), the receiving device 20 may transmit the proxy data ACK to the relay device 30 (S87).

Figure 16:
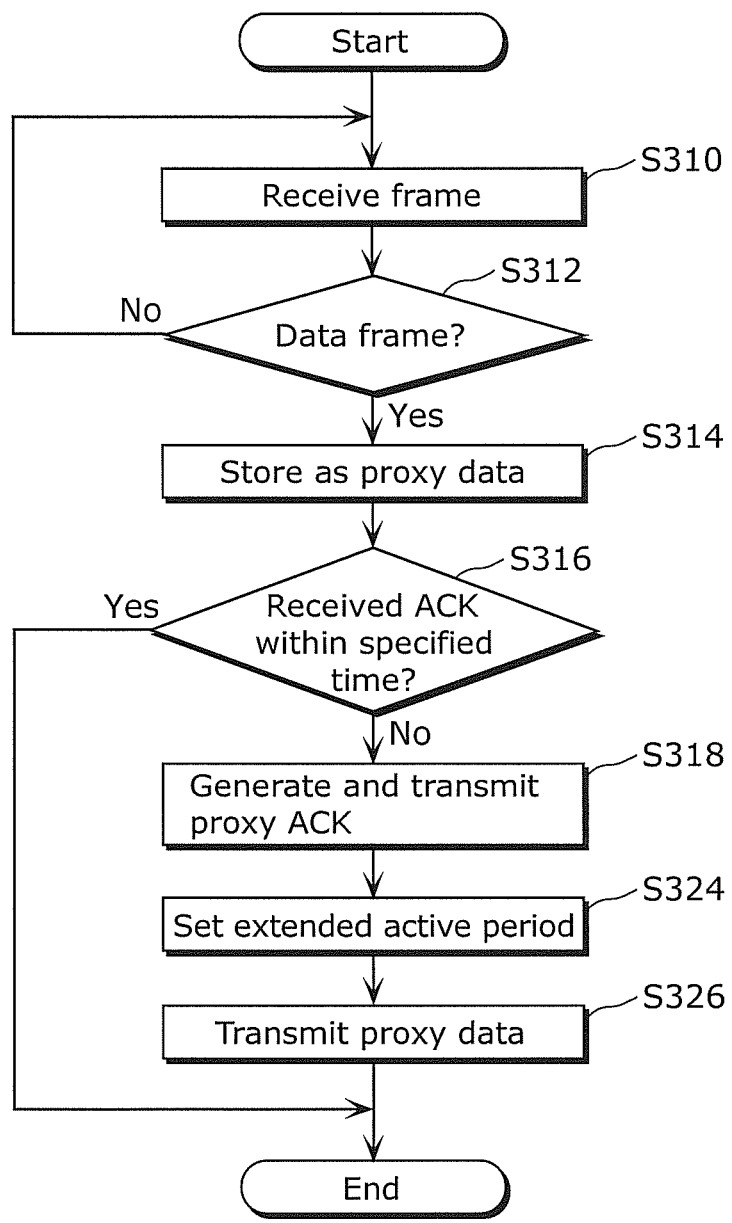
FIG. 16 is a flowchart illustrating an operation of a relay device according to the embodiment 1 of the present invention.

Next, a processing flow of the relay device 30 will be described with reference to FIG. 16.

As described above, the transmitting device 10 and the receiving device 20b are not in a range where the communication therebetween is allowed, and thus the receiving device 20b cannot receive the data frame 50. On the other hand, the relay device 30 is in the range where the transmitting device 10 is communicable therewith, and thus the relay device 30 receives the data frame 50 (S310).

The frame determination unit 334 parses the received frame to determine whether the received frame is a data frame (S312). If the received frame is the data frame 50 (Yes in S312), the frame determination unit 334 stores the received data frame 50 as proxy data in the storage unit 341. It should be noted that the frame determination unit 334 may determine whether the destination address of the data frame 50 is the own address, and perform the processing steps from step S314 only when the destination address is determined to be other than the own address. In this case also, the destination of the data frame 50, here, is the receiving device 20b, and thus the frame determination unit 334 included in the relay device 30 temporarily stores the data frame 50 in the storage unit 341 (S314).

Next, the relay device 30 determines whether the ACK frame can be received until the wait time T11, which is for the ACK frame to the data frame 50 transmitted by the transmitting device 10, is elapsed (S316). Here, only when it is determined that the ACK frame cannot be received until the wait time T11 is elapsed (NO in S316), the relay device 30 transmits to the transmitting device 10 the proxy ACK frame 51 which is proxy for the ACK frame to the data frame 50 (S318).

Here, the transmitting device 10 receives, as being transmitted from the receiving device 20b, the proxy ACK frame 51 in which an address of the receiving device 20b is set as the destination address (S318).

Next, the communication control unit 340 sets the extended active period for the relay device 30 (S324).

Subsequently, the communication control unit 340 transmits, as the proxy data frame 52, the data frame 50 stored in the storage unit 341 to the receiving device 20b (S326).

Figure 17:
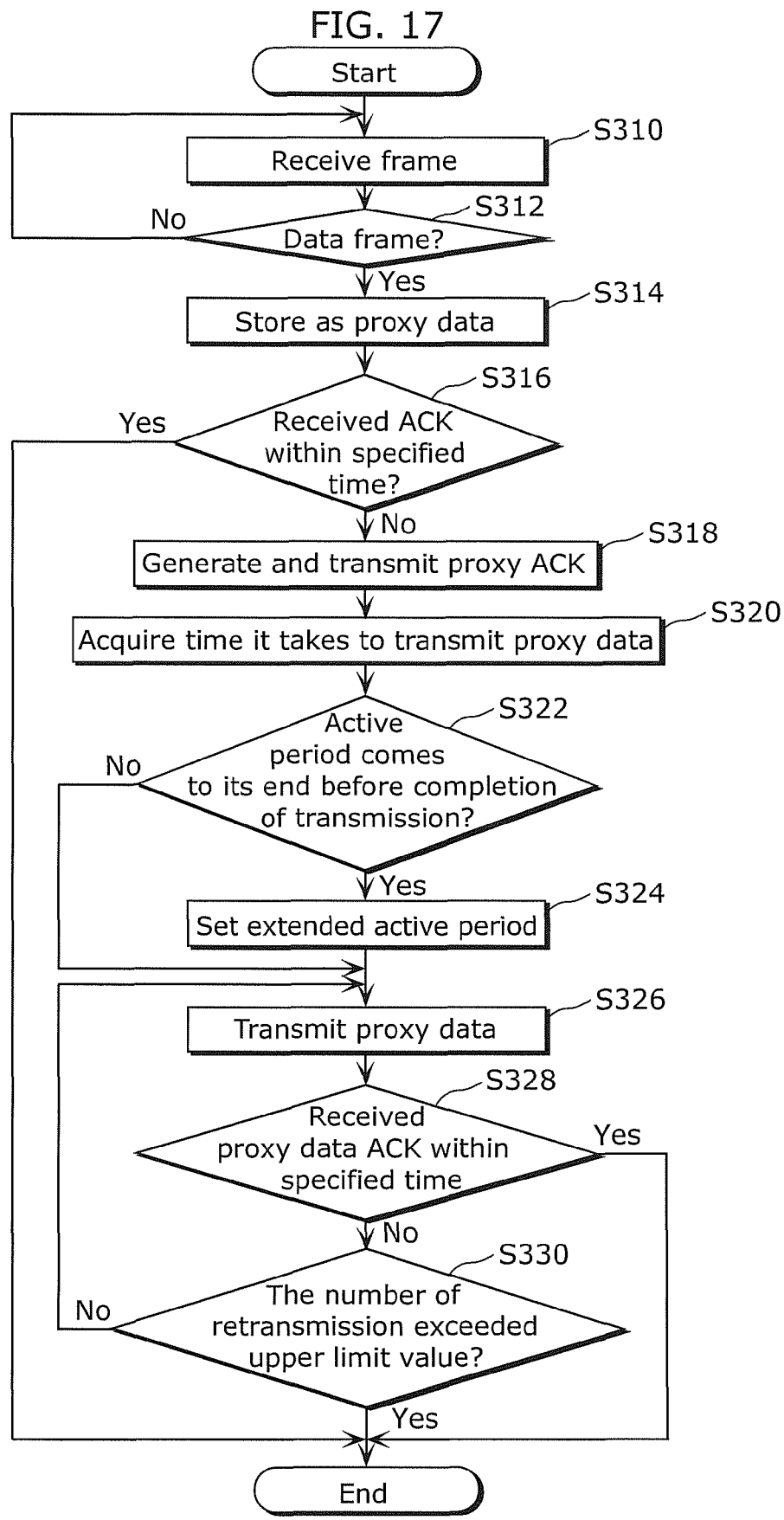
FIG. 17 is a flowchart illustrating another operation of the relay device according to the embodiment 1 of the present invention.

It should be noted that, as shown in FIG. 17, the communication control unit 340 may determine whether the active period comes to its end in an interval between the start of transmission of the proxy data frame 52 to the end of the transmission (S322), and only when the active period comes to its end (Yes in S322), may set the extended active period (S324). Furthermore, the communication control unit 340 may determine prior to step S326 whether the active period comes to its end before the proxy data ACK frame 53 which is an acknowledgement to the proxy data frame 52 is received.

For example, the communication control unit 340 acquires the data size of the proxy data 52 and divides the data size by the communication speed between the receiving device 20b and the relay device 30, thereby calculating a time required for the completion of reception of the proxy data 52. Moreover, the communication control unit 340 can know the end time of the current active period through the beacon frame periodically received by the communication control unit 340. Thus, if a time $T_3$ at which the time required for the completion of transmission of the proxy data frame 52 has been elapsed since the start of the transmission of the proxy ACK frame is an end time $T_4$ of the active period or later, the communication control unit 340 may set the extended active period which is at least a difference between $T_3$ and $T_4$.

If the communication control unit 340 determines that the active period comes to its end before the transmission of the proxy data frame 52 is completed (Yes in S322), the communication control unit 340 sets the extended active period (S324) and transmits the proxy data frame 52 (S326).

It should be noted that, as shown in FIG. 17, the relay device 30 determines, after step S326, whether the proxy data frame 52 has been received from the receiving device 20b within a specified time (S328), and, if not (No in S328), may repeat the retransmission of the proxy data frame 52 (S326) while the number of retransmission is less than a maximum value of a predetermined number of retransmissions (No in S330).

The above operation allows continuous communication even in the wireless network system where there is a mixture of the active period 1007 and the inactive period 1008, without the relay device 30 entering the inactive period in the middle of relaying the data frame to go to sleep. As a result, delay time can be reduced to the wait time indicated by T13 shown in FIG. 11. This can mitigate the effect of transmission delay on the application.

In other words, the transmitting device 10 according to the present embodiment generates and transmits the ACK frame in which the destination is associated with a sequence number to the receiving device. As a result, even in the ACK frame (namely, a frame that is transmitted as the receipt acknowledgement to a frame) such as of IEEE 802.15.4 in which no Addressing Field indicative of the destination of the frame is included, the receiving device can determine a destination receiving device toward which the received ACK frame, to which the receipt acknowledgement corresponds, has been transmitted. This allows the receiving device to determine whether the received frame has been transmitted by the relay device. If it is determined, as a result, that the received frame has been transmitted by the relay device, relay of a transmission frame with low delay is possible by setting the extended active period.

Moreover, if the receiving device 20 according to the present embodiment determines that the received frame has been transmitted by the relay device, the receiving device 20 sets the extended active period so that the receiving device 20 can receive all frames to subsequently be transmitted by the relay device in a period until the next beacon is transmitted. As a result, a frame relay with low delay is possible.

Moreover, the relay device 30 according to the present embodiment sets, in the inactive period determined by the wireless communication system, the extended active period that is a period in which at least the own device is communicable until the completion of transmission of the frame being relayed, thus, preventing the relay device from going to the sleep state while transmitting the frame to be relayed. Thus, the relay device can relay frames with low delay in the wireless communication system in which the wireless communication is performed in the active period and the wireless communication is interrupted in the inactive period.

Embodiment 2

Next, a relay device a according to an embodiment 2 of the present invention will be described.

Figure 18:
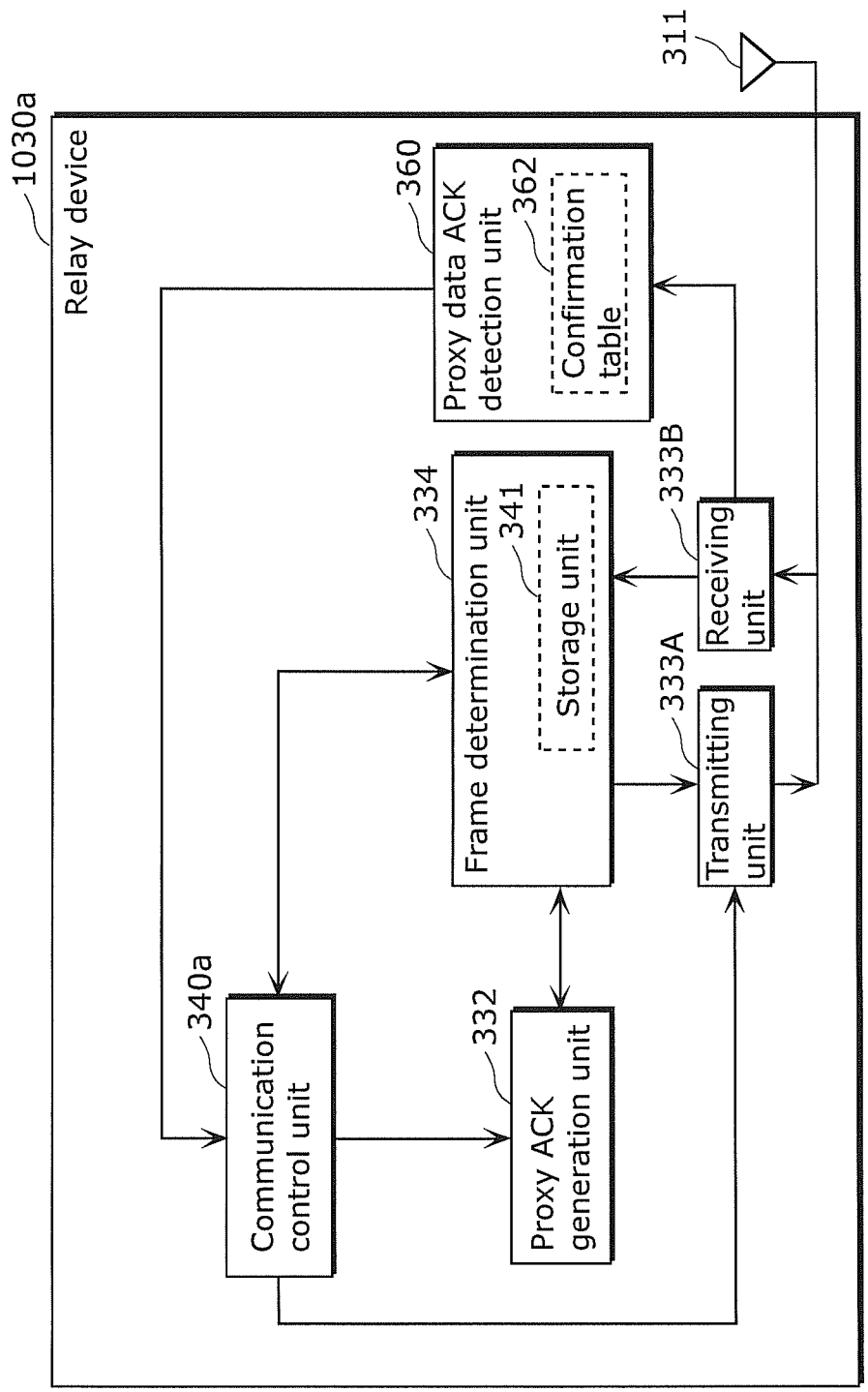
FIG. 18 is a block diagram showing a configuration of a relay device according to the embodiment 2 of the present invention.

FIG. 18 is a block diagram showing a functional configuration of a relay device 1030a according to the embodiment 2. It should be noted that the same reference signs will be used to refer to the same components of the relay device 30 shown in FIG. 9 and the detailed description will be omitted.

The relay device 1030a according to the present embodiment is different from the relay device 30 according to the embodiment 1 shown in FIG. 9 in that the relay device 1030a further includes a proxy data ACK detection unit 360.

The proxy data ACK detection unit 360 detects a fifth frame (namely, the proxy data ACK frame 53) which is transmitted by the receiving device 20 toward the transmitting device 10 as the receipt acknowledgement to the fourth frame (namely, a proxy data frame 52).

The proxy data ACK detection unit 360 stores, in association, the identifier unique to the receiving device 20 and a confirmation result which indicates whether the fifth frame corresponding to the fourth frame is detected in a predetermined period starting from when the fourth frame has been transmitted, in a confirmation table 362 included in the proxy data ACK detection unit 360.

When the communication control unit 340a cannot receive the second frame, which corresponds to the first frame, from the receiving device 20 which is the destination of the first frame, in a predetermined period starting from when the first frame is received, and the confirmation result which is stored in the confirmation table 362 and corresponds to the identifier of the receiving device indicates that the fifth frame has not previously been detected, the communication control unit 340a (A) causes a transmitting unit 333A to transmit the third frame to a transmitting device 10 and the receiving device 20, (B) sets an extended active period so that the transmission of the fourth frame is completed within the active period, and (C) causes the transmitting unit 333A to transmit the first frame stored in a frame determination unit 334 to the receiving device 20 as the fourth frame.

Figure 19:
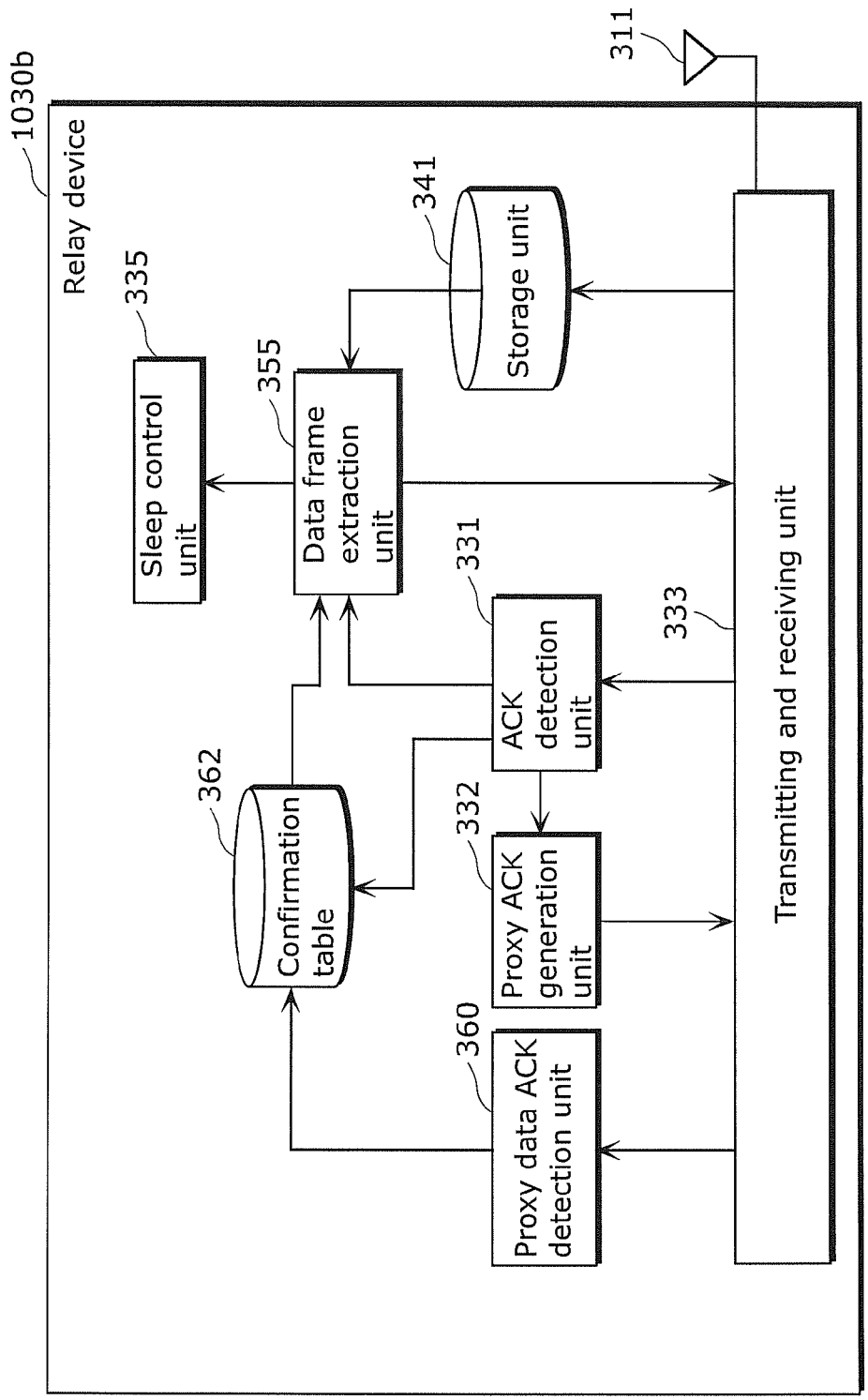
FIG. 19 is a block diagram showing another configuration of the relay device according to the embodiment 2 of the present invention.

It should be noted that, as with a relay device 1030b shown in FIG. 19, the same advantageous effects of the present invention can be achieved by adding the confirmation table 362 and the proxy data ACK detection unit 360 to the relay device 1030 according to the variation of the embodiment 1.

Figure 20:
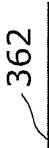
FIG. 20 is a diagram showing an example of a data structure of a confirmation table 362 according to the embodiment 2 of the present invention.

FIG. 20 is a diagram showing an example of a data structure of the confirmation table 362.

As shown in FIG. 20, the confirmation table 362 stores, in association, a terminal address which is an identifier unique to the receiving device 20 and a confirmation result indicating whether the fifth frame has arrived from the receiving device 20 indicated by the terminal address.

For example, the confirmation result corresponding to a terminal address, 0x0011, is "SUCCESSFUL". This indicates that the proxy data ACK detection unit 360 has successfully detected the fifth frame in a predetermined time when the fourth frame has previously transmitted to the receiving device 20 the identifier of which is 0x0011. Thus, the communication control unit 340a performs processing steps ((A) to (C) described above) for relaying a data frame that is transmitted toward the receiving device 20 the terminal address of which is specified by 0x0011.

The confirmation result corresponding to the terminal address, 0x0013, is "FAILED". This indicates that the proxy data ACK detection unit 360 has failed to detect the fifth frame in the predetermined time when the fourth frame has previously been transmitted to the receiving device 20 the identifier of which is 0x0013. Thus, the communication control unit 340a does not relay the data frame that is transmitted toward the receiving device 20 the terminal address of which is specified by 0x0013.

The communication control unit 340a receives the data frame that is transmitted toward the receiving device the terminal address of which is specified by, for example, 0xffff, and if the terminal addresses in the confirmation table 362 does not include 0xffff, the communication control unit 340a relays the data frame to the receiving device 20 the terminal address of which is specified by 0xffff. After the relay, if the proxy data ACK detection unit 360 can detect, in the predetermined time, the fifth frame transmitted from the receiving device 20 the terminal address of which is 0xffff, the proxy data ACK detection unit 360 stores the terminal address, 0xffff, and the confirmation result, "SUCCESSFUL", in association in the confirmation table 362.

On the other hand, after the relay, if the proxy data ACK detection unit 360 cannot detect, in the predetermined time, the fifth frame transmitted from the receiving device 20 the terminal address of which is 0xffff, the proxy data ACK detection unit 360 stores the terminal address, 0xffff, and the confirmation result, "FAILED", in association in the confirmation table 362.

It should be noted that while the confirmation result stored in the confirmation table 362 is represented as "SUCCESSFUL" and "FAILED" in the present embodiment, the confirmation result can be stored in any format representing two states such as "RECEIVABLE" and "UNRECEIVABLE", "OK" and "NG", and "1" and "0". Moreover, in the confirmation table 362, the confirmation result may be stored as any of a total of three states which are the two states, "SUCCESSFUL" and "FAILED" plus, for example, "UNKNOWN" or "2" as information indicating that whether a fifth data frame can be received is unknown.

Figure 21:
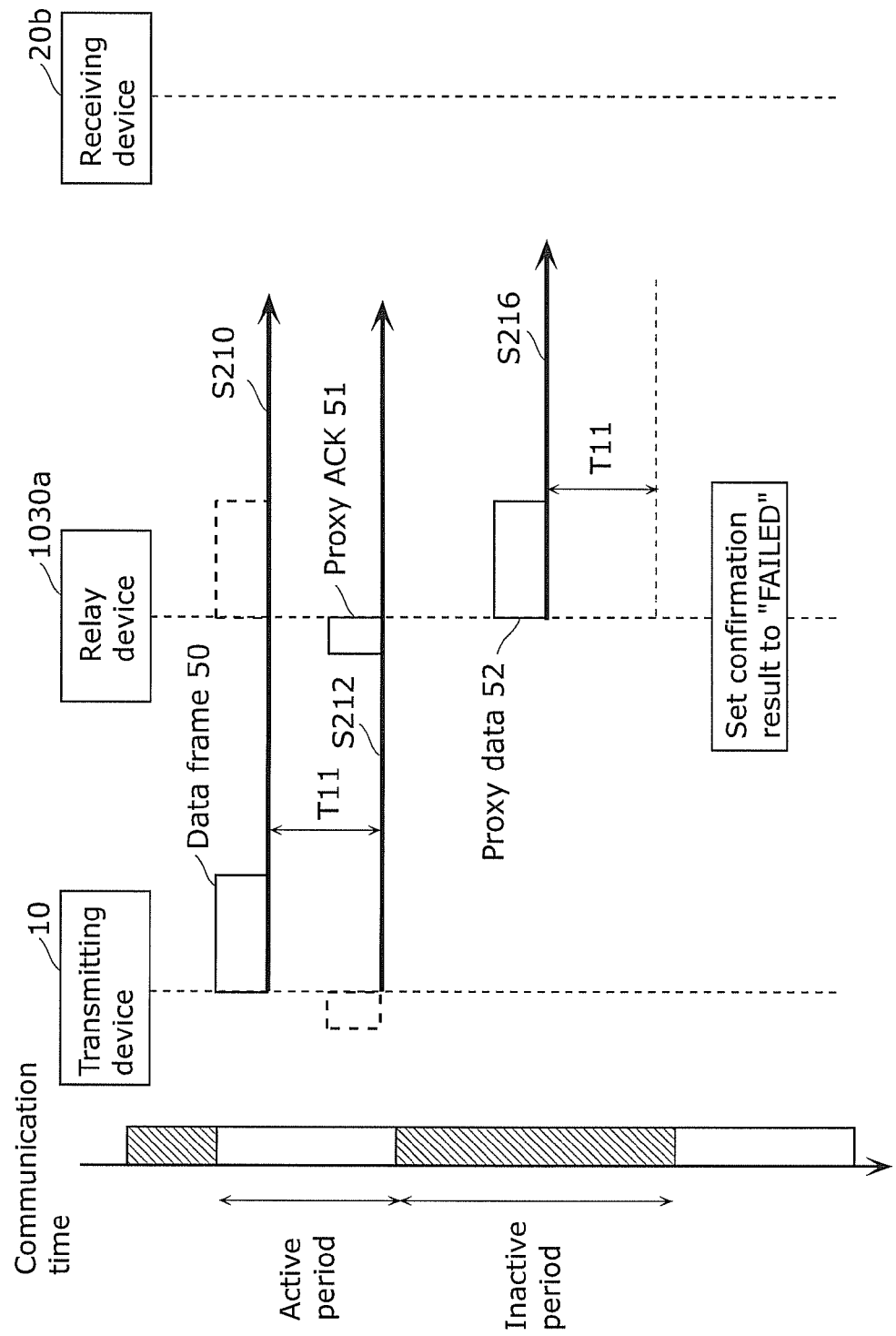
FIG. 21 is a diagram showing a sequence of a wireless communication system which includes the relay device according to the embodiment 2 of the present invention.

FIG. 21 is a diagram showing a sequence of the wireless communication system that includes the relay device 1030a according to the present embodiment.

Once the relay device 1030a receives the data frame 50 transmitted from the transmitting device 10 toward the receiving device 20b located at a distance where direct communication thereto from the transmitting device 10 is not allowed (S210), the communication control unit 340a confirms whether the fifth frame has previously been transmitted from the receiving device 20b, with reference to the confirmation table 362. Here, if the confirmation result indicating that the detection of the fifth frame has failed is not stored in the confirmation table 362, the communication control unit 340a transmits the proxy ACK 51 and, subsequently, transmits the proxy data 52 to the receiving device 20b (S216). Then, the communication control unit 340a waits for a predetermined time (for example, T11) for the fifth frame which is a receipt acknowledgement to the proxy data 52 from the receiving device 20b.

It should be noted that examples of the case where the confirmation result indicating that the detection of the fifth frame has failed is not stored in the confirmation table 362 include a case where the confirmation result indicating that the fifth frame from the receiving device 20b has been received is stored in the confirmation table 362 and a case where the confirmation result with respect to the receiving device 20b is not stored in the confirmation table 362.

Here, when both the receiving device 20b and the relay device 1030a are located where direct communication therebetween is not allowed, the relay device 1030a cannot receive the fifth frame. Thus, the proxy data ACK detection unit 360 included in the relay device 1030a stores in the confirmation table 362 the confirmation result indicating that the reception of the fifth frame from the receiving device 20b has failed.

Figure 22:
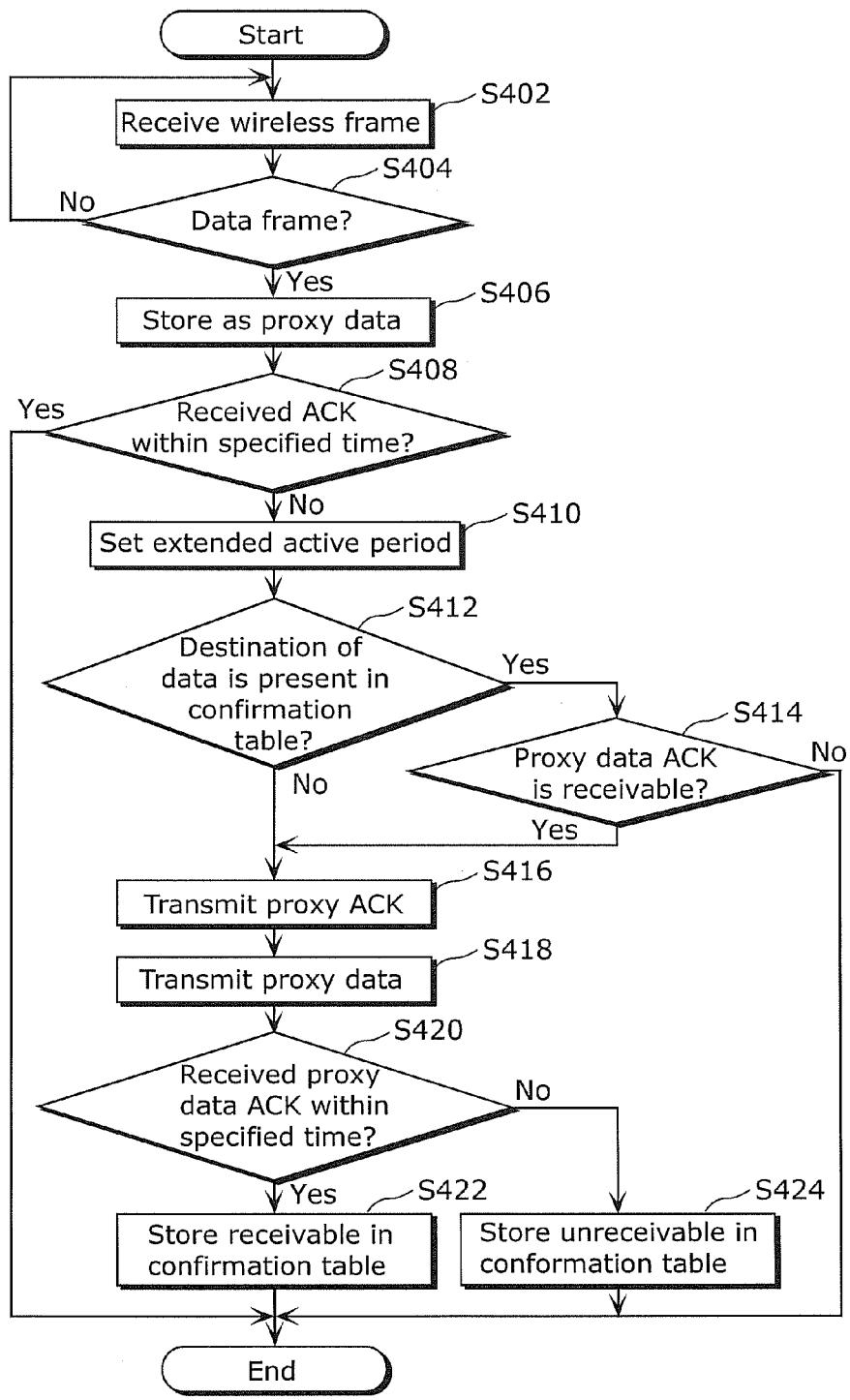
FIG. 22 is a flowchart illustrating a processing flow of the relay device according to the embodiment 2 of the present invention.

FIG. 22 is a flowchart illustrating a processing flow of the relay device 1030a according to the present embodiment.

When the receiving unit 333B receives the wireless frame (S402) and the frame determination unit 334 determines that the received frame is a data frame (Yes in S404), the frame determination unit 334 stores the frame in the storage unit 341 (S406).

Then, if the ACK frame corresponding to the receive data frame has been received within a specified time (Yes in S408), the communication control unit 340a ends the processing. On the other hand, if the ACK frame has not been received within the specified time, the communication control unit 340a determines that the data frame need be relayed, and sets the extended active period (S410).

Next, the communication control unit 340a determines whether a destination of the data frame to be relayed is present in the confirmation table 362 (S412). If the destination is present as a result of the determination (Yes in S412), the communication control unit 340a refers to the confirmation result of a corresponding proxy data ACK (S414). Here, if the confirmation result indicates that the reception of the proxy data ACK has failed (No in S414), the communication control unit 340a ends the processing.

On the other hand, if the destination of the data frame to be relayed is not present in the confirmation table 362 (No in S412) or if the confirmation result indicating that the destination of the data frame to be relayed has received the proxy data is stored in the confirmation table 362 (Yes in S414), the communication control unit 340a transmits the proxy ACK generated by the proxy ACK generation unit 332 (S416).

Next, the communication control unit 340a transmits, as proxy data, the data frame stored in the storage unit 341 to the destination of the data frame (S418).

Next, the proxy data ACK detection unit 360 determines whether the proxy data ACK corresponding to the transmitted proxy data has been received within a specified time (S420). If the reception is failed as a result, the proxy data ACK detection unit 360 stores, in the confirmation table 362, information ("FAILED") indicating that the reception of the proxy data ACK has failed (S424). On the other hand, if the reception of the proxy data ACK is successful, the proxy data ACK detection unit 360 stores, in the confirmation table 362, information ("SUCCESSFUL") indicating that the proxy data ACK has been received (S422).

It should be noted that if the proxy data ACK detection unit has failed to receive the proxy data ACK in step S420, the proxy data may be retransmitted within a predetermined number of times.

Figure 23:
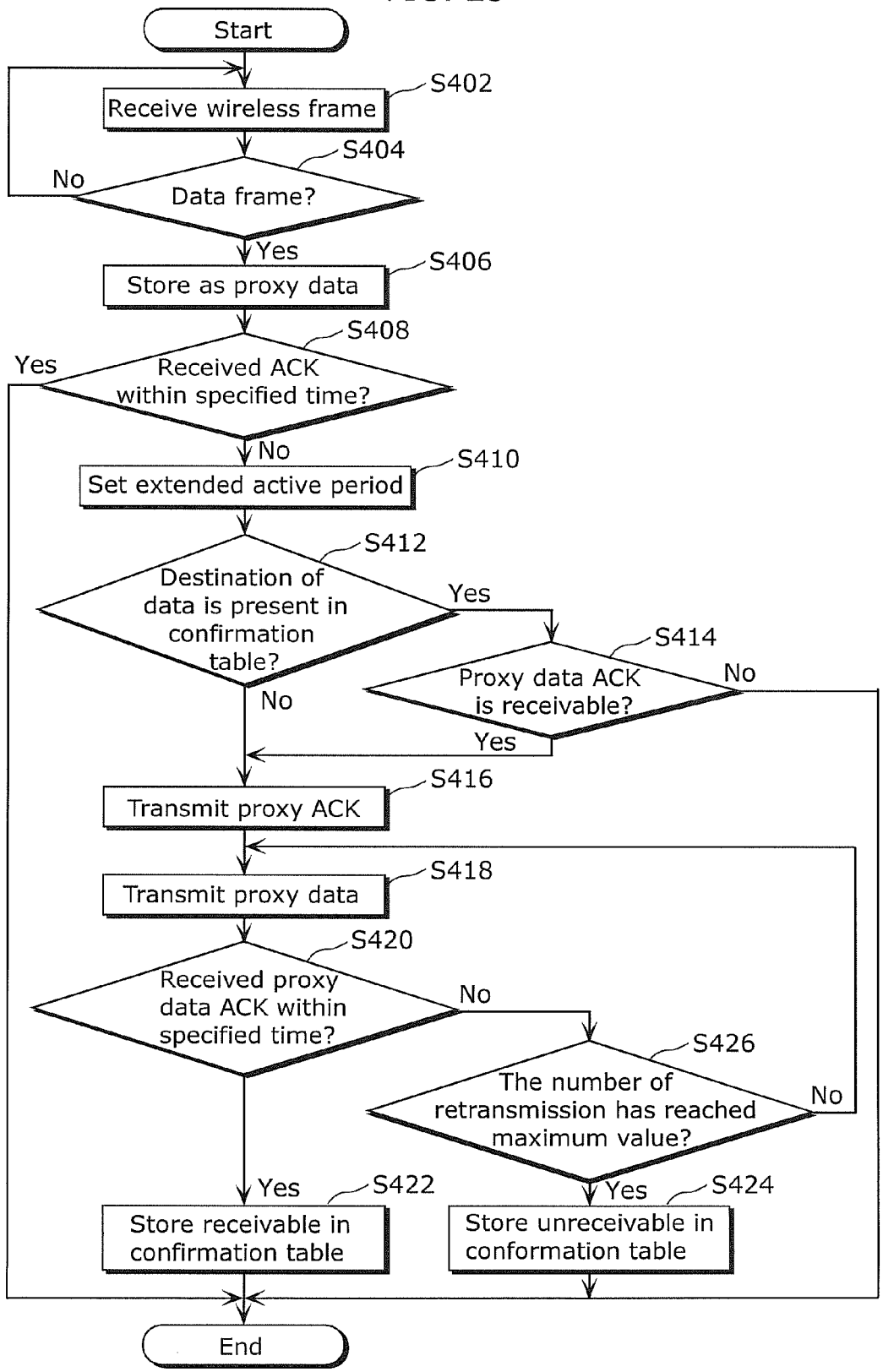
FIG. 23 is another flowchart illustrating a processing flow of the relay device according to the embodiment 2 of the present invention.

For example, referring to FIG. 23, if the proxy data ACK detection unit fails to receive the proxy data ACK within the specified time (No in S420), the communication control unit retransmits the proxy data (S418) as long as the number of retransmission is less than a maximum value allowed (No in S426). In this case, when the number of retransmission reaches the maximum number of times allowed (Yes in S426), the proxy data ACK detection unit 360 stores information ("FAILED") indicating that the reception of the proxy data ACK has failed, in the confirmation table 362 (S424).

It should be noted that the communication control unit 340a may determine, before setting the extended active period in step S410, whether the active period comes to its end before the transmission of the data frame is completed. In this case, the communication control unit 340a may set the extended active period in step S410 only if determined that the active period comes to its end.

It should be noted that the connection configuration according to the embodiments 1 and 2 of the present invention and the variations thereof is not limited to the wireless communication. For example, the connection configuration may be a wired communication which allows the wireless network system according to the present invention to communicate with various transmission media, such as a power line (an electric line), a telephone line, a coaxial cable, an optical cable, Ethernet (registered trademark), USB (Universal Serial Bus), HDMI (High-Definition Multimedia Interface; registered trademark), and IEEE 1394.

It should be noted that the configurations according to the embodiments 1 and 2 of the present invention and the variations thereof are described taking, as an example, the transmission of data frame in downlink in which the data frame is forwarded from the transmitting device via the relay device to the receiving device. However, the present invention is not limited thereto and the data frame may be transferred in uplink in which the data frame is forwarded from the receiving device via the relay device to the transmitting device. Such a configuration can be readily envisioned by a combination of the embodiments described above. In other words, the data frame relay of the wireless communication system according to the present invention is applicable not only to downlink but also to uplink.

It should be noted that in the configurations according to the embodiments 1 and 2 of the present invention and the variations thereof, the role functions of the transmitting device, the relay device, and the receiving device are distinctly separated. However, the present invention is not limited thereto, and may be embodied as a wireless transmission device incorporating all the role functions therein, which can support a P2P (Peer to Peer) mesh network.

It should be noted that the configuration according to the embodiment of the present invention can be achieved using a program to be executed by a computer running on CPU or MPU.

In other words, the program causes the computer to execute a relay method comprising: step (a) receiving a frame; step (b) storing the first frame when the received frame is determined to be the first frame; and step (c) when the second frame is not received within a predetermined period after reception of the first frame, transmitting a third frame which is a proxy frame of the second frame; setting an extended active period which is a period in which communication is allowed to continue after an end of the active period, in the inactive period subsequent to the active period; and transmitting to the receiving device, in the extended active period, a fourth frame which is the first frame stored in the determination.

Moreover, the program may be stored in a storage medium such as a ROM (Read Only Memory) and a RAM (Random Access Memory), or may be distributed via a transmission medium such as the Internet.

It should be noted that the configurations of the wireless devices according to the embodiments 1 and 2 of the present invention and variations thereof are not limited to software configurations operating on CPU or MPU, and may typically be implemented using hardware such as an LSI (Large Scale Integration) which is an integrated circuit. These processing components may separately be mounted on one chip, or the whole configuration or a part of the configuration of the processing components may be mounted on one chip. The term, IC, system LSI, super LSI, ultra LSI, or the like may be used to refer to the integrated circuit, depending on the difference in degree of integration. Moreover, the integrated circuit is not limited to the LSI and may be implemented using a dedicated circuit or a general-purpose processor. Furthermore, an FPGA (Field Programmable Gate Array) or a reconfigurable processor in which connection or settings of circuit cells in LSI is reconfigurable, may be used. Furthermore, if circuit integration technology emerges replacing current semiconductor technology due to advance in semiconductor technology or other technology derived therefrom, the functional blocks may, of course, be integrated using the technology. For example, application of biotechnology is possible.

Figure 24:
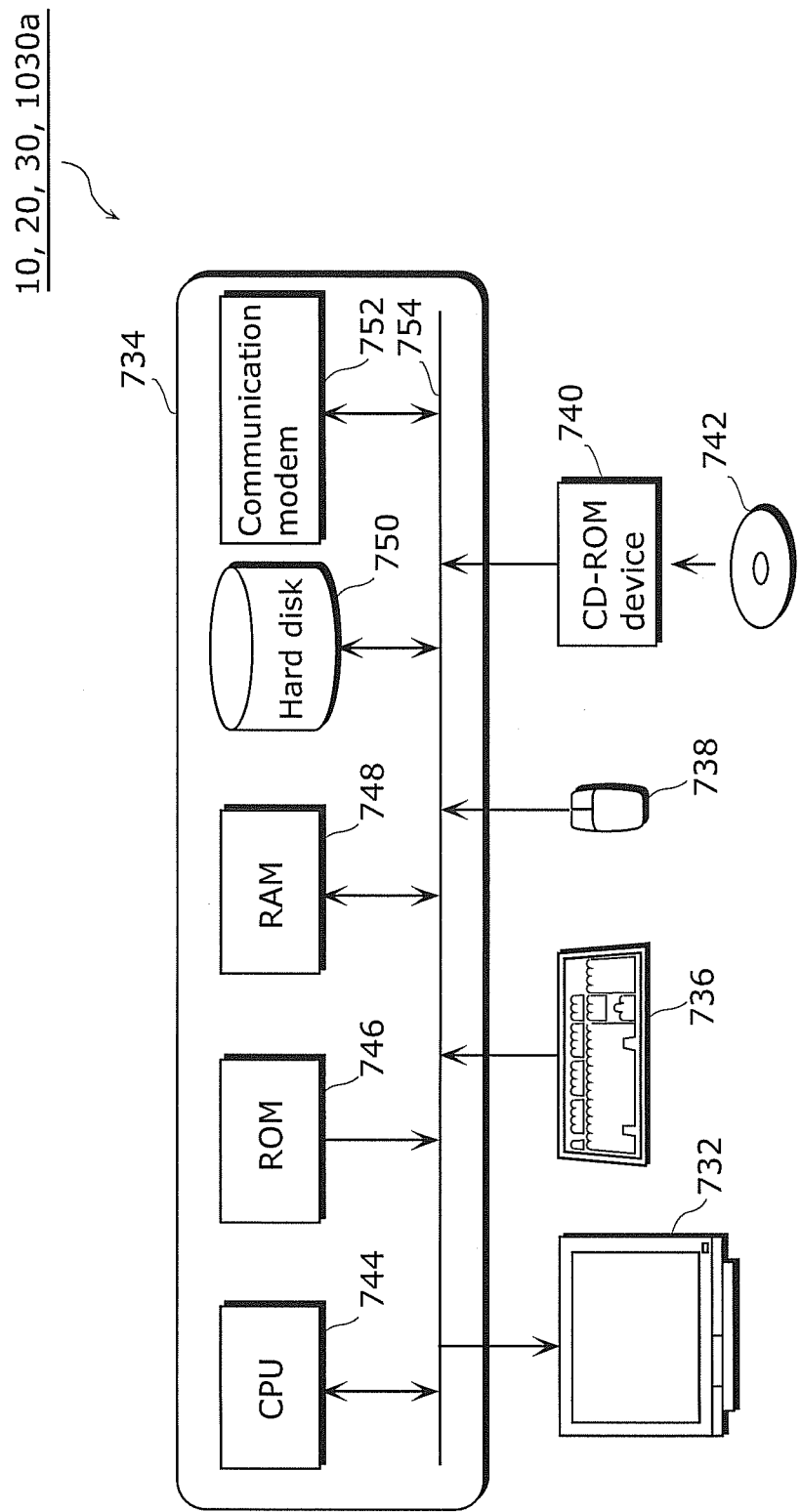
FIG. 24 is a block diagram showing a hardware configuration of a computer system which implements the relay devices, the receiving devices, and the transmitting devices according to the embodiments 1 and 2 of the present invention and the variations thereof.

More specifically, FIG. 24 is a block diagram showing the hardware configuration of a computer system which implements the transmitting device 10, the receiving device 20, the relay device 30, the relay device 1030a, and so on that are the wireless devices according to the embodiments 1 and 2, and the variations thereof.

The wireless devices each include a computer 734, a keyboard 736 and a mouse 738 whereby instructions are given to the computer 734, a display 732 on which information on the result by the computer 734 is presented, a CD-ROM (Compact Disc-Read Only Memory) device 740 and communication modem 752 whereby the program to be executed by the computer 734 is read.

The program which includes the processing steps performed by the wireless devices is stored in a CD-ROM 742 which is a computer-readable storage medium, and read by the CD-ROM device 740. Alternatively, the program is read by the communication modem 752 via a computer network.

The computer 734 includes a CPU (Central Processing Unit) 744, a ROM (Read Only Memory) 746, a RAM (Random Access Memory) 748, a hard disk 750, the communication modem 752, and a bus 754.

The CPU 744 executes the program read by the CD-ROM device or read via the communication modem 752. The ROM 746 stores therein programs and data required for operation of the computer 734. The RAM 748 stores therein data such as parameters for execution of the program. The hard disk 750 stores therein programs and data. The communication modem 752 performs a communication with other computer via a computer network. The bus 754 interconnects the CPU 744, the ROM 746, the RAM 748, the hard disk 750, the communication modem 752, the display 732, the keyboard 736, the mouse 738, and the CD-ROM device 740.

Furthermore, part or the whole of the components included in each device described above may be configured with an IC card or a single module detachable to each device. The IC card or the module is a computer system which includes the microprocessor, ROM, RAM, or the like. The IC card or the module may include the super multi-function LSI described above. The IC card or the module achieves its functionality by the microprocessor operating in accordance with the computer program. The IC card or the module may be of tamper-resistant.

Moreover, the present invention may be the methods described above. Moreover, the present invention may be a computer program implementing such methods via a computer, or digital signals including the computer program.

Furthermore, the present invention may be a computer-readable recording medium having recorded therein the computer program or the digital signals, such as a flexible disk, a hard disk, CD-ROM, MO, DVD, DVD-ROM, DVD-RAM, BD (Blu-ray Disc (registered trademark)), memory card such as a USB memory and a SD card, and a semiconductor memory. Moreover, the present invention may be the digital signals recorded in such recording mediums.

Moreover, the present invention may be the computer program or the digital signals transmitted via an electric communication line, a wireless or wired communication line, a network represented by the Internet, data broadcast or the like.

Moreover, the present invention may be a computer system which includes a microprocessor and a memory, the memory may store therein the computer program, and the microprocessor may operate in accordance with the computer program.

Moreover, by transferring the program or the digital signals stored in the recording medium, or transferring the program or the digital signals via the network or the like, the program or the digital signals may be executed in other independent computer system.

Furthermore, the embodiments and variations described above may be combined.

The embodiments as have been disclosed herein are merely illustrative and should not be interpreted as restrictive. The scope of the present invention is interpreted by the scope of the appended claims rather than by the description set forth above, and includes modifications equivalent to the appended claims and within the scope thereof.

INDUSTRIAL APPLICABILITY

The present invention is applicable to relay devices and so on, and, in particular, to a relay device and so on in a wireless communication system in which the relay device relays a first frame that is transmitted toward a receiving device from a transmitting device and which is a wireless communication system in which the wireless communication is performed in an active period and the wireless communication is interrupted in an inactive period

REFERENCE SIGNS LIST 10, 1012 Transmitting device
20, 20a, 20b, 1014, 1020 Receiving device)
30, 1011, 1030, 1030a, 1030b Relay device
50, 70, 1050, 1060 Data frame (first frame)
51, 1051, 1061 Proxy ACK frame (third frame, proxy ACK)
52, 1052, 1062 Proxy data frame (fourth frame, proxy data)
53, 1053, 1063 Proxy data ACK frame (fifth frame, proxy data ACK)
80 ACK frame (second frame)
86, 88 Device address
110 Wireless communication system
111, 311 Antenna
112, 212, 333 Transmitting and receiving unit
112A, 212A, 333A Transmitting unit
112B, 212B, 333B Receiving unit
113 Frame generation unit
114, 214 Execution unit
115 Selection unit
116, 116a, 116b, 216 SN storage unit
213, 334 Frame determination unit
217 SN determination unit
221 Relay determination unit
222, 340, 340a Communication control unit
331 ACK detection unit
332 Proxy ACK generation unit 335 Sleep control unit
341 Storage unit
355 Data frame extraction unit
360 Proxy data ACK detection unit
362 Confirmation table
732 Display
734 Computer
736 Keyboard
738 Mouse
740 CD-ROM device
742 CD-ROM
744 CPU
746 ROM
748 RAM
750 Hard disk
752 Communication modem
754 Bus
1001 Control device
1002, 1003, 1004 Terminal device
1006 Beacon period
1007 Active period
1008 Inactive period
1009 Beacon
1100 Extended active period

The invention claimed is:

1. A relay device for relaying a first frame transmitted toward a receiving device from a transmitting device in a wireless communication system in which, between the transmitting device and the receiving device, wireless communication is performed in an active period and the wireless communication is interrupted in an inactive period, the relay device comprising:
 a receiving unit configured to receive a frame;
 a transmitting unit configured to transmit a frame;
 a frame determination unit configured to store therein the first frame when the frame determination unit determines that the received frame is the first frame;
 a proxy ACK generation unit configured to generate a third frame which is a proxy frame of a second frame which is a frame to be transmitted from the receiving device, as a receipt acknowledgement to the first frame; and
 a communication control unit configured to, when the receiving unit does not receive the second frame within a predetermined period after reception of the first frame:
  (i) cause the transmitting unit to transmit the third frame;
  (ii) set an extended active period which is a period in which communication is allowed to continue after an end of the active period, in the inactive period subsequent to the active period; and
  (iii) cause the transmitting unit to transmit to the receiving device, in the extended active period, a fourth frame which is the first frame stored in the frame determination unit.

2. The relay device according to claim 1,
wherein when the receiving unit does not receive the second frame within the predetermined period after reception of the first frame, the communication control unit is configured to: cause the transmitting unit to transmit the third frame to the transmitting device and the receiving device; set the extended active period to allow transmission of the fourth frame to be completed within the active period; and cause the transmitting unit to transmit the fourth frame to the receiving device.

3. The relay device according to claim 1, further comprising
 a proxy data ACK detection unit configured to detect a fifth frame transmitted by the receiving device to the transmitting device, as a receipt acknowledgement to the fourth frame,
 wherein the proxy data ACK detection unit is configured to store, in association with an identifier unique to the receiving device, a confirmation result indicating whether the fifth frame has been detected within a predetermined period after transmission of the fourth frame, and
 when the second frame is not received from the receiving device within a predetermined period and the confirmation result in association with the identifier of the receiving device does not indicate that detection of the fifth frame has failed, the communication control unit is configured to: cause the transmitting unit to transmit the third frame to the receiving device; set the extended active period to allow transmission of the fourth frame to be completed within the active period; and cause the transmitting unit to transmit the fourth frame to the receiving device.

4. A receiving device for receiving a first frame relayed by a relay device after the first frame is transmitted from a transmitting device in a wireless communication system in which between the transmitting device and the receiving device, wireless communication is performed in an active period and the wireless communication is interrupted in an inactive period, the receiving device comprising:
 a receiving unit configured to receive a frame which includes a sequence number;
 a relay determination unit configured to determine, based on the sequence number included in the received frame, whether the received frame is a frame that has been transmitted from the relay device; and
 a communication control unit configured to, when it is determined that the received frame is the frame that has been transmitted from the relay device, set an extended active period which is a period in which communication is allowed to continue after an end of the active period, in the inactive period subsequent to the active period, to allow reception of the first frame relayed by the relay device to be completed within the active period.

5. The receiving device according to claim 4, further comprising
 an SN storage unit configured to store, in association, an identifier unique to the receiving device and a sequence number that can be assigned to the receiving device by the transmitting device,
 wherein the relay determination unit includes:
  a frame determination unit configured to determine a type of the frame received by the receiving unit; and
  an SN determination unit, and
 the frame includes a sequence number assigned by the transmitting device and type information indicating the type of the frame,
 the frame determination unit is configured to determine whether the type of the frame matches a type of a frame transmitted as a receipt acknowledgement to the first frame, with reference to the type information included in the frame,
 the SN determination unit is configured to determine whether the sequence number included in the frame matches the sequence number associated with the identifier of the receiving device, with reference to the SN storage unit, and when the frame determination unit determines that the type of the frame matches the type of the frame transmitted as the receipt acknowledgement to the first frame and the SN determination unit determines that the sequence number included in the frame matches the sequence number associated with the identifier of the receiving device, the relay determination unit is configured to determine that the frame has been transmitted by the relay device.

6. A transmitting device for transmitting a first frame to a receiving device via a relay device in a wireless communication system in which, between the transmitting device and the receiving device, wireless communication is performed in an active period and the wireless communication is interrupted in an inactive period, the transmitting device comprising:
- an SN storage unit configured to store therein an identifier unique to the receiving device and a sequence number associated with the identifier;
- a selection unit configured to select the sequence number associated with the identifier of the receiving device, as a sequence number to be assigned to the first frame;
- a frame generation unit configured to generate the first frame which includes the selected sequence number; and
- a transmitting unit configured to transmit the generated first frame,
- wherein the relay device receives and stores the first frame, and
- when the relay device does not receive a second frame, which is a frame to be transmitted from the receiving device, as a receipt acknowledgement to the first frame, the relay device (i) generates and transmits a third frame which is a proxy frame of the second frame, (ii) sets an extended active period which is a period in which communication is allowed to continue after an end of the active period, in the inactive period subsequent to the active period, and (iii) transmits to the receiving device, in the extended active period, a fourth frame which is the stored first frame.

7. A relay method for relaying a first frame transmitted toward a receiving device from a transmitting device in a wireless communication system in which, between the transmitting device and the receiving device, wireless communication is performed in an active period and the wireless communication is interrupted in an inactive period, the relay method comprising:

(a) receiving a frame;
(b) storing the first frame when the received frame is determined to be the first frame; and
(c) when the second frame is not received within a predetermined period after reception of the first frame,
- (i) transmitting a third frame which is a proxy frame of the second frame,
- (ii) setting an extended active period which is a period in which communication is allowed to continue after an end of the active period, in the inactive period subsequent to the active period, and
- (iii) transmitting to the receiving device, in the extended active period, a fourth frame which is the first frame stored in the determination.

8. The relay method according to claim 7, further comprising
(d) detecting a fifth frame transmitted by the receiving device to the transmitting device, as a receipt acknowledgement to the fourth frame,
wherein in step (d), storing, in association with an identifier unique to the receiving device, a confirmation result indicating whether the fifth frame has been detected within a predetermined period after transmission of the fourth frame, and
in step (c), when the second frame is not received from the receiving device within a predetermined period and the confirmation result in association with the identifier of the receiving device does not indicate that detection of the fifth frame has failed, transmitting the third frame to the receiving device; transmitting to the receiving device the first frame stored in the determination as a fourth frame; setting the extended active period to allow transmission of the fourth frame to be completed within the active period; and transmitting the fourth frame to the receiving device.

9. A non-transitory computer-readable recording medium having stored therein a program for causing a computer to execute the relay method according to claim 7.

10. An integrated circuit for implementing the relay method according to claim 7.

11. The relay device according to claim 1, wherein the relay device performs communication with the receiving device and the transmitting device in an active period and does not perform communication with the receiving device and the transmitting device in an inactive period, the active period and the inactive period being predetermined and shared by the receiving device and the transmitting device.

* * * * *